US008651749B2

(12) United States Patent
Dainese Júnior et al.

(10) Patent No.: US 8,651,749 B2
(45) Date of Patent: Feb. 18, 2014

(54) FIBER OPTIC INTERFACE WITH TRANSLATABLE FERRULE DEVICE

(75) Inventors: Paulo Clóvis Dainese Júnior, Painted Post, NY (US); Michael de Jong, Colleyville, TX (US); Jeffery Alan DeMeritt, Painted Post, NY (US); Micah C. Isenhour, Lincolnton, NC (US); Dennis M. Knecht, Hickory, NC (US); James P. Luther, Hickory, NC (US)

(73) Assignee: Corning Incorporated, Corning, NY (US)

( * ) Notice: Subject to any disclaimer, the term of this patent is extended or adjusted under 35 U.S.C. 154(b) by 309 days.

(21) Appl. No.: 13/050,753

(22) Filed: Mar. 17, 2011

(65) Prior Publication Data

US 2011/0229083 A1    Sep. 22, 2011

Related U.S. Application Data

(60) Provisional application No. 61/315,418, filed on Mar. 19, 2010.

(51) Int. Cl.
*G02B 6/38* (2006.01)

(52) U.S. Cl.
USPC .......................................................... 385/74

(58) Field of Classification Search
USPC .......................................................... 385/74
See application file for complete search history.

(56) References Cited

U.S. PATENT DOCUMENTS

| 4,213,677 A | 7/1980 | Sugimoto et al. | 350/96.18 |
| 4,268,112 A | 5/1981 | Peterson | 350/96.18 |
| 4,701,011 A | 10/1987 | Emkey et al. | 350/96.18 |
| 5,172,271 A | 12/1992 | Sinclair | 359/652 |
| 5,384,874 A | 1/1995 | Hirai et al. | 385/34 |
| 5,784,512 A | 7/1998 | Hensen | 385/61 |
| 5,832,153 A | 11/1998 | Duck | 385/34 |
| 5,850,493 A | 12/1998 | Cheng | 385/34 |
| 5,923,802 A | 7/1999 | Giebel et al. | 385/76 |
| 6,012,852 A | 1/2000 | Kadar-Kallen et al. | 385/74 |
| 6,033,125 A | 3/2000 | Stillie et al. | 385/75 |
| 6,157,485 A | 12/2000 | Cheng | 359/495 |

(Continued)

FOREIGN PATENT DOCUMENTS

| AU | 199898138 B2 | 8/1999 |
| JP | 63-293510 | 11/1988 |
| WO | WO01/11409 A2 | 2/2001 |
| WO | WO03/076993 A1 | 9/2003 |

OTHER PUBLICATIONS

Patent Cooperation Treaty, International Search Report and Written Opinion, May 24, 2011, 8 pgs.

(Continued)

*Primary Examiner* — Jerry Rahll

(57) ABSTRACT

Optical fiber ferrules (10, 20) for making optical or optical and electrical connections are disclosed, along with receptacle and plug fiber optic interface devices (60, 70) using the ferrules, and cable assemblies (6, 7) using the fiber optic interface devices. The optical fiber ferrules support optical pathways (14) and have front ends (12F, 22F) with mating geometries that facilitate a relatively high number of mating/unmating cycles. The ferrule is translatable within the enclosure (62e, 72e). Resilient members (75) provide the ferrule with forward-bias and rear-bias positions when the fiber optic interface device is un-mated and mated, respectively.

29 Claims, 17 Drawing Sheets

(56) References Cited

U.S. PATENT DOCUMENTS

| | | | |
|---|---|---|---|
| 6,246,026 B1 | 6/2001 | Vergeest | 219/121.72 |
| 6,542,665 B2 | 4/2003 | Reed et al. | 385/34 |
| 6,632,025 B2 | 10/2003 | Ukrainczyk | 385/70 |
| 6,655,850 B2 | 12/2003 | Mann et al. | 385/74 |
| 6,687,434 B2 | 2/2004 | Ishikawa | 385/34 |
| 6,724,959 B1* | 4/2004 | Takahashi et al. | 385/33 |
| 6,736,547 B2 | 5/2004 | Stevens et al. | 385/61 |
| 6,837,625 B2 | 1/2005 | Schott et al. | 385/60 |
| 6,899,464 B2 | 5/2005 | Stevens et al. | 385/53 |
| 6,963,687 B2 | 11/2005 | Vergeest et al. | 385/123 |
| 7,077,576 B2 | 7/2006 | Luther et al. | 385/59 |
| 7,104,701 B1 | 9/2006 | Durrant et al. | 385/74 |
| 7,329,050 B1 | 2/2008 | Dugan et al. | 385/55 |
| 7,346,236 B2 | 3/2008 | Asano et al. | 385/34 |
| 7,346,237 B2 | 3/2008 | Matsumura et al. | 385/34 |
| 7,357,005 B2 | 4/2008 | Matsumura et al. | 65/387 |
| 7,460,750 B2 | 12/2008 | Durrant et al. | 385/35 |
| 7,572,071 B1 | 8/2009 | Wu | 385/94 |
| 7,603,008 B2 | 10/2009 | Matsumura et al. | 385/35 |
| 7,775,725 B2 | 8/2010 | Grinderslev | 385/74 |
| 2002/0146211 A1 | 10/2002 | Stevens et al. | 385/61 |
| 2003/0012513 A1 | 1/2003 | Ukrainczyk | 385/61 |
| 2003/0021543 A1 | 1/2003 | Mann et al. | 385/74 |
| 2004/0009697 A1 | 1/2004 | Clark et al. | 439/362 |
| 2006/0222299 A1 | 10/2006 | Durrant et al. | 385/74 |
| 2008/0050072 A1 | 2/2008 | Durrant et al. | 385/74 |
| 2008/0279509 A1 | 11/2008 | Durrant et al. | 385/72 |
| 2009/0041412 A1 | 2/2009 | Danley et al. | 385/85 |
| 2009/0324175 A1 | 12/2009 | Everett et al. | 385/72 |
| 2009/0324176 A1 | 12/2009 | Cheng et al. | 385/73 |
| 2010/0027943 A1 | 2/2010 | Armani et al. | 385/74 |
| 2010/0104244 A1 | 4/2010 | Grinderslev | 385/74 |
| 2010/0215325 A1 | 8/2010 | Tamura et al. | 385/89 |
| 2011/0097039 A1* | 4/2011 | Zhao et al. | 385/70 |
| 2012/0099822 A1 | 4/2012 | Kuffel et al. | 385/78 |

OTHER PUBLICATIONS

W. J. Tomlinson, "Applications of GRIN-rod lenses in optical fiber communications systems," Applied Optics, Apr. 1, 1980, vol. 19, No. 7, pp. 1127-1138.

Emkey, et al., "Analysis and Evaluation of Graded-Index Fiber-Lenses," Journal of Lightwave Technology, vol. LT-5, No. 9, Sep. 1987, pp. 1156-1164.

Palais, Joseph C, "Fiber coupling using graded-index rod lenses," Applied Optics, Jun. 15, 1980, vol. 19, No. 12, pp. 2011-2018.

http:\\www.cvimellesgroit.com, "Gradient-Index Lenses".

Chanclou, et al., "Design and demonstration of a multicore single-mode fiber coupled lens device," Optics Communications 233, 2004, pp. 333-339.

Senior, et al., "Misalignment losses at multimode graded-index fiber splices and GRIN rod lens couplers," Applied Optics, Apr. 1, 1985, vol. 24, No. 7, pp. 977-983.

Gilsdorf, et al., "Single-mode fiber coupling efficiency with graded-index rod lenses," Applied Optics, Jun. 1, 1994, vol. 33, No. 16, pp. 3440-3445.

Cusworth, et al., "Angular tilt misalignment loss at a GRIN rod lens coupler," Applied Optics, Jun. 1, 1986, vol. 25, No. 11, pp. 1775-1779.

* cited by examiner

FIBER OPTIC INTERFACE WITH TRANSLATABLE FERRULE DEVICE

CLAIM OF PRIORITY

This application claims the benefit of priority under 35 U.S.C. §119(e) of U.S. Provisional Application Ser. No. 61/315,418, entitled "Ferruled Optical USB Connector," filed on Mar. 19, 2010.

FIELD

The disclosure is directed to any optical interface in which easy access for cleaning is accomplished by including retractable elements in one or both of the mating components, for example plugs, adapters, and fiber optic interface devices. More specifically, the disclosure is directed to fiber optic interface devices with complementary mating geometries, including fiber optic interface devices having either optical or electrical and optical connection capability, wherein the fiber optic interface device ferrule is translatable.

BACKGROUND

Optical fiber is increasingly being used for a variety of applications, including but not limited to broadband voice, video, and data transmission. As consumer devices are steadily using more bandwidth, fiber optic interface devices for these devices will likely move away from electrical connections and toward using optical connections for increased bandwidth. Generally speaking, conventional fiber optic interface devices used for telecommunication networks and the like are not suitable for consumer electronic devices.

For instance, conventional fiber optic interface devices are relatively large compared with the consumer devices and their interfaces. Additionally, conventional fiber optic interface devices are deployed with great care into relatively clean environments and/or cleaned by the craft before connecting the same. Further, even though fiber optic interface devices are reconfigurable (i.e., suitable for mating/unmating), they are not intended for a relatively large number of mating cycles. Instead, conventional fiber optic interface devices are high-precision connectors designed for reducing insertion loss between mating fiber optic interface devices in the optical network.

On the other hand, the consumer electronic devices are expected to have a relatively large number of mating/unmating cycles during ordinary operation. The consumer electronic devices will be operated in a multitude of environments where dirt, dust, and other debris are encountered on a regular basis. Further, consumer electronic devices typically have size and space constraints for making connections. Consequently, there is an unresolved need for fiber optic interface devices suitable for consumer electronic devices.

SUMMARY

The disclosure is directed to optical fiber interfaces having ferruled fiber optic plugs, adapters, interconnections, or fiber optic interface devices having a ferrule that is translatable. More specifically, the disclosure is directed to ferruled fiber optic interface devices with complementary mating geometries—including fiber optic interface devices having both electrical and optical connection capability—where the fiber optic interface device ferrule is translatable so that it can be in a retracted (rear-biased) position or an unretracted (forward-biased) position. The unretracted position allows for the front end of the ferrule to be readily cleaned, while the retracted position serves to reduce the chances of the ferrule front end from being contaminated with environmental contaminants, e.g., dirt, debris, dust, liquid, etc.

One disclosed embodiment is directed to a first fiber optic ferrule having a body with a plurality of optical pathways and a mating geometry having at least one slot monolithically formed in the body. The slot of the first fiber optic ferrule permits a relatively high number of mating/unmating cycles without generating excessive wear and debris, thereby making it suitable for consumer electronic devices or the like.

The disclosure is also directed to fiber optic interface devices and cable assemblies using the first fiber optic ferrule.

Another embodiment is directed to a second fiber optic ferrule having a complementary mating geometry for the first fiber optic ferrule. The second fiber optic ferrule includes a body having a plurality of optical pathways and a mating geometry that has at least one guide pin that is monolithically formed in the body and at least one spring retention feature disposed on a rear portion of the fiber optic ferrule. The second fiber optic ferrule reduces the number of parts required for a fiber optic interface device and allows for quick and easy assembly.

The disclosure is also directed to fiber optic interface devices and cable assemblies using the fiber optic ferrule. The disclosure can include a retractable alignment structure, for example retractable pins.

An aspect of the disclosure includes a fiber optic interface device having a ferrule body that has front and rear ends connected by one or more optical pathways configured to respectively operably support the one or more optical waveguides. The device also includes one or more optical waveguides respectively supported by the one or more optical pathways. The device has an enclosure with front and rear ends and an interior in which the ferrule body is translatably supported. The interior has a storage region adjacent the ferrule body that is configured to loosely store one or more excess portions of the one or more optical waveguides. The device also includes at least one resilient member operably configured relative to the ferrule to provide a forward-bias position of the ferrule when the fiber optic interface device is unmated and a rear-bias position of the ferrule when the fiber optic interface device is mated.

In various examples, the optical fiber connects described herein are configured to mate and unmate with a reasonable amount of force, e.g., with a gram-force of between 25 gf and 1,500 gf, and more preferably between 500 gf and 1,000 gf.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Reference is now be made in detail to the preferred embodiments of the disclosure, examples of which are illustrated in the accompanying drawings. Whenever possible, like reference numbers are used to refer to like components or parts.

The ferrules, fiber optic interface devices and/or cable assemblies described herein are suitable for making optical or optical and electrical connections for a variety of devices, and are particularly well suited for consumer electronic devices. The concepts of the disclosure advantageously allow the simple, quick, and economical connection and disconnection of the fiber optic interface devices for a relatively large number of mating cycles.

In the discussion below, the term "electronic device" means a device that has either electronic or optical and electronic components and functionality, including a fiber optic interface device and associated hardware configured to receive, transmit or both transmit and receive optical signals and also communicate electrical power. Also in the discussion below and in the claims, the terms "ferrule" and "ferrule body" can be used interchangeably.

Example Ferrules with Complementary Mating Geometries

Figure 1A:
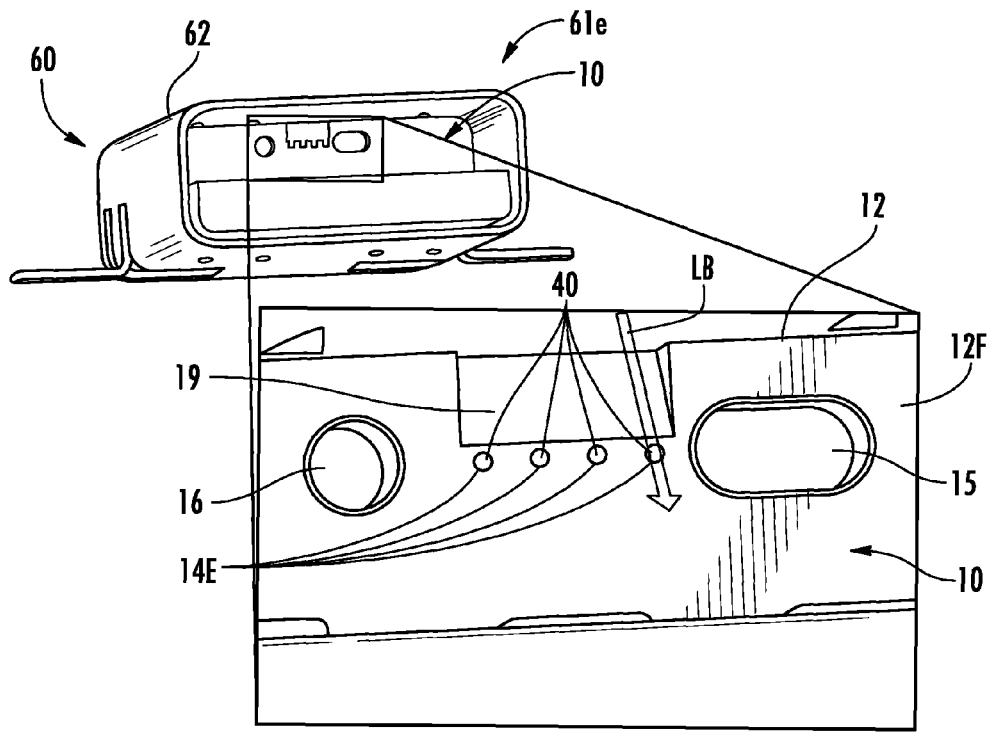
FIG. 1A is isometric end view of a fiber optic interface device having a close-up view of a first fiber optic ferrule with complementary mating geometry for mating with the fiber optic ferrule shown in FIG. 2 and FIG. 3.
Figure 2:
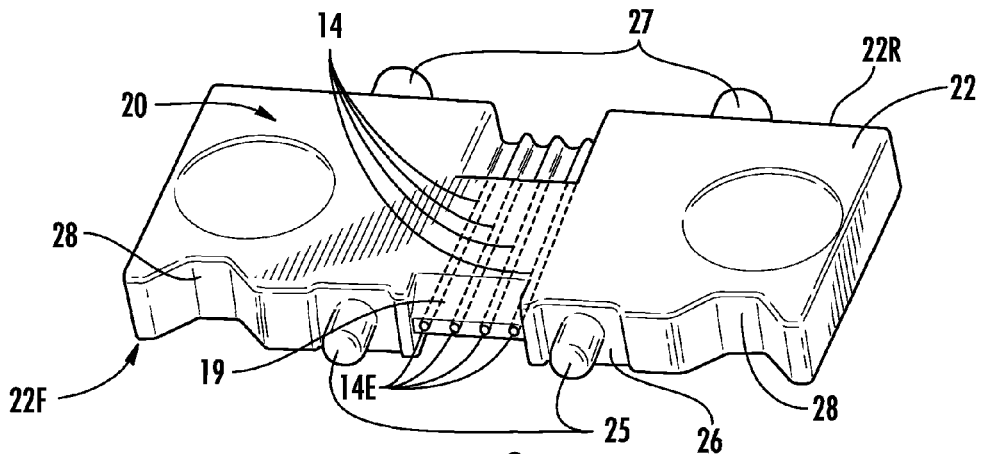
FIGS. 2 and 3 respectively are front and rear isometric views of a second fiber optic ferrule having mating geometry suitable for mating with the first ferrule of FIG. 1.
Figure 3:
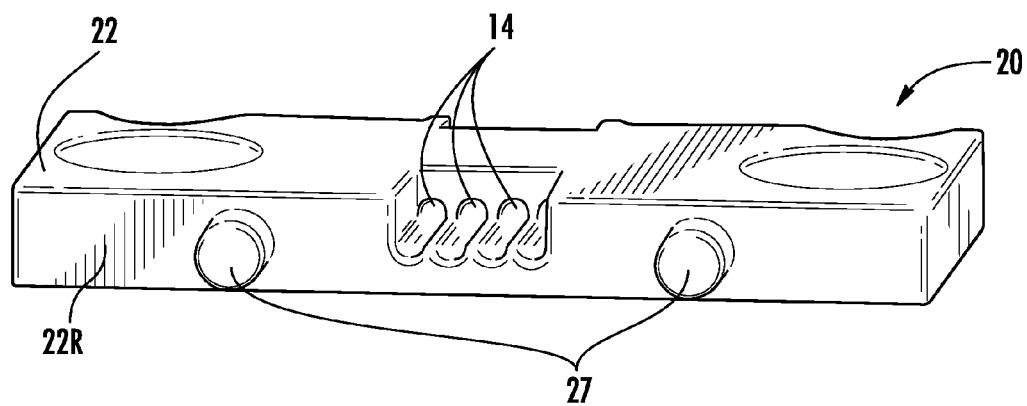

FIGS. 1A, 2 and 3 are isometric views that depict examples of a first fiber optic ferrule 10 (FIG. 1A) and a second fiber optic ferrule 20 (FIG. 2 and FIG. 3). First and second fiber optic ferrules 10 and 20 have complementary mating geometries for use in suitable complementary structures for making fiber optic interface devices including for example, fiber optic plugs, adapters, interconnections, and fiber optic interface devices. Specifically, FIG. 1A is an isometric view of a first fiber optic ferrule 10 (hereinafter, ferrule) that is a portion of a first fiber optic interface device 60. FIGS. 2 and 3 are isometric views of a second ferrule 20. As shown, first ferrule 10 includes a body 12 with a front end 12F that is configured in a mating geometry for interfacing and making an optical connection with second ferrule 20 having a body 22 with a front end 22F and a rear end 22R.

First ferrule body 12 also includes a plurality of optical pathways 14 with ends 14E at ferrule body front end 12F. As used herein, "optical pathways" mean any suitable structure or component of the ferrule for permitting the transmission of optical signals. By way of example, optical pathway(s) 14 may include optical fiber bores for receiving and supporting therein respective optical waveguides such as optical fibers, an optical lens (lens elements), an active device such as a vertical-cavity surface-emitting laser (VCSEL), a photodiode, a photodetector other active device, or other structure or component of, or attached to, the ferrule for transmitting or receiving optical signals.

The mating geometry of first ferrule 10 includes a slot 15 for receiving a guide pin 25 of second ferrule 20 when the ferrules are mated together. In this embodiment, the mating geometry of first ferrule 10 also includes a second female portion such as a hole 16 that cooperates with slot 15 when mating with a complementary ferrule. In other words, slot 15 and hole 16 each receive a respective guide pin 25 of the second ferrule. Slot 15 and hole 16 are sized and spaced for cooperating with guide pins 25 of second ferrule 20.

As used herein, slot means that the mating geometry is sufficiently oversized with respect to its complementary mating geometry in the direction that passes through both centerlines of the mating geometry (i.e., the X-axis), thereby allowing a larger alignment tolerance between the slot and its corresponding mating geometry such as the pin. Ferrules with mating geometry that includes one or more slots allow for a large number of mating cycles since they do not generate a high level of debris with a relatively large number of mating cycles as do conventional ferrules having tight-tolerance bore and guide pin mating geometry for creating an interference fit.

Additionally, slot 15 allows for a larger tolerance between the complementary mating geometry such as guide pins of a mating ferrule. In other words, the tolerance of the mating geometry of the second ferrule may have a larger variance while still providing suitable alignment and optical performance.

Figure 1B:
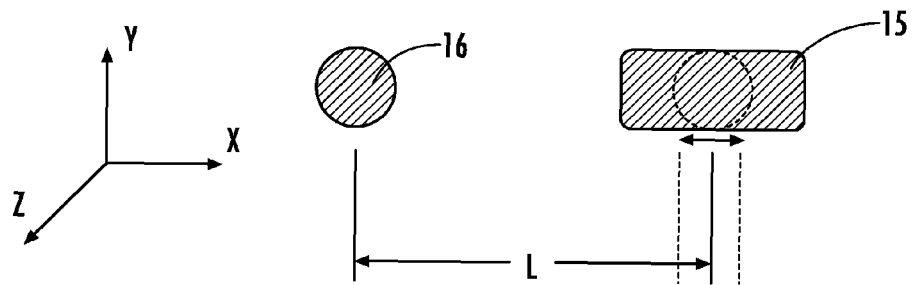
FIG. 1B is a schematic representation of the cooperation of the mating geometry of the ferrule of FIG. 1A and the ferrule of FIG. 2.

FIG. 1B is a schematic representation of the mating geometry between first ferrule 10 and second ferrule 20. Specifically, the mating geometry of first ferrule 10 is represented by the shaded area and the mating geometry of second ferrule 20 is represented by the dashed lines. Although the mating geometry is schematically depicted as round shape or a slot shape with rounded ends, any suitable shape(s) may be used for the mating geometry (i.e., slot, holes, and/or pins) such as square, rectangular, hexagonal etc. As shown, the left-side of the mating geometry between the first ferrule 10 and the second ferrule 20 have a relatively snug fit using the same shape, thereby creating an alignment reference datum. On the other hand, the right-side of the mating geometry between the first ferrule 10 and the second ferrule 20 do not have the same shape. In other words, the slot 15 of the first ferrule 10 is larger than the mating feature (e.g. the guide pin 25) of second ferrule 20, and thus provides a tolerance about a centerline distance L between the left-side and right-side mating geometry as shown. Additionally, the mating geometry may include a chamfer or the like at the edges to aid in alignment and/or reduce wear and debris with repeated matings.

FIGS. 2 and 3 depict an example embodiment of a second ferrule 20 in a form suitable for mating with first ferrule 10. Second ferrule 20 includes a body 22 with the aforementioned plurality of optical pathways 14 in the form of multiple bores for receiving and supporting respective optical waveguides such as optical fibers 40 (not shown in FIG. 2 and FIG. 3; see FIG. 9). Second ferrule 20 includes a mating geometry having at least one guide pin 25 sized and configured for being received by the mating geometry of first ferrule 10, thereby aligning the optical waveguides of the two mating ferrules. As shown, guide pins 25 are monolithically formed with the body 22 of the second ferrule 20. In other words, guide pins 25 are made from the same material and are integral with body 22 of ferrule 20.

In the embodiment shown, second ferrule 20 has two guide pins 25 that are monolithically formed in the body of the second ferrule 20 on opposite sides of the plurality of optical pathways 14. Unlike conventional fiber optic ferrules using precision-machined guide pins that are received into guide pin bores of the ferrule and held in place with a pin retainer, the guide pins 25 of second ferrule 20 are molded into body 22, machined, or otherwise monolithically formed. Further, guide pins 25 of ferrule 20 protrude a sufficient distance to engage the mating geometry (e.g., slot 15 and hole 16) of first ferrule 10, thereby aligning the optical waveguides (e.g., optical fibers 40; see FIG. 9) mounted within the respective optical pathways 14 (e.g. bores) of the mated ferrules 10 and 20. However, first ferrule 10 may be mated with a complementary ferrule using a conventional type ferrule where one or more conventional guide pins are received in guide pin bores of the ferrule.

The mating geometry of the first and second ferrules 10 and 20 disclosed herein provides an advantage over conventional mating geometry for numerous reasons. Conventional mating geometry uses a dedicated guide pin that fits into a guide pin bore of the conventional ferrule and typically results in an interference fit between the guide pins and guide pin bores due to variance in guide pin bore spacing. This interference fit used with conventional ferrules causes wear and debris when subject to a relatively high number of mating cycles.

On the other hand, using a first ferrule 10 with at least one slot 15 reduces wear and the amount of debris generated with a large number of mating cycles. Additionally, forming guide pins 25 monolithically with the body 22 of second ferrule 20 provides a reliable and low-cost solution that is suitable for relatively high-mating cycles such as experienced with consumer electronic devices. Stated another way, the mating geometry is advantageous since it allows a large number of mating/unmating cycles such as typical with consumer electronic devices. Moreover, the mating geometry of the first ferrule 10 with at least one slot 15 reduces the wear between the mating geometry of the ferrules compared with the conventional mating geometry.

Second ferrule 20 may optionally include other features. As shown, second ferrule 20 has at least one retention feature 27 disposed on a rear end 22R of body 22. More specifically, second ferrule 20 has at least two retention features 27 disposed at rear end 22R of the ferrule and disposed on opposite sides of the plurality of optical pathways 14. Retention features 27 are configured to retain respective resilient members 75 (introduced and discussed below; see e.g., FIG. 9), such as springs. Although retention features 27 are shown as protrusions, other structures are possible such as blind holes, recesses, snap-on structures, or the like.

Further, second ferrule 20 may optionally include one or more stops 28' (see FIG. 2). Specifically, second ferrule 20 includes two stops 28 that are recessed from the ferrule body front end 22F and disposed on opposite sides of the plurality of optical pathways 14, but the stop(s) maybe be flush or extend beyond ferrule body front end 22F. Other areas of second ferrule 20 may also have recessed areas. By way of example, second ferrule 20 optionally includes a recessed area 26 about guide pins 25, both of which are monolithically formed in ferrule body 22, as best shown in FIG. 2.

Figure 11:
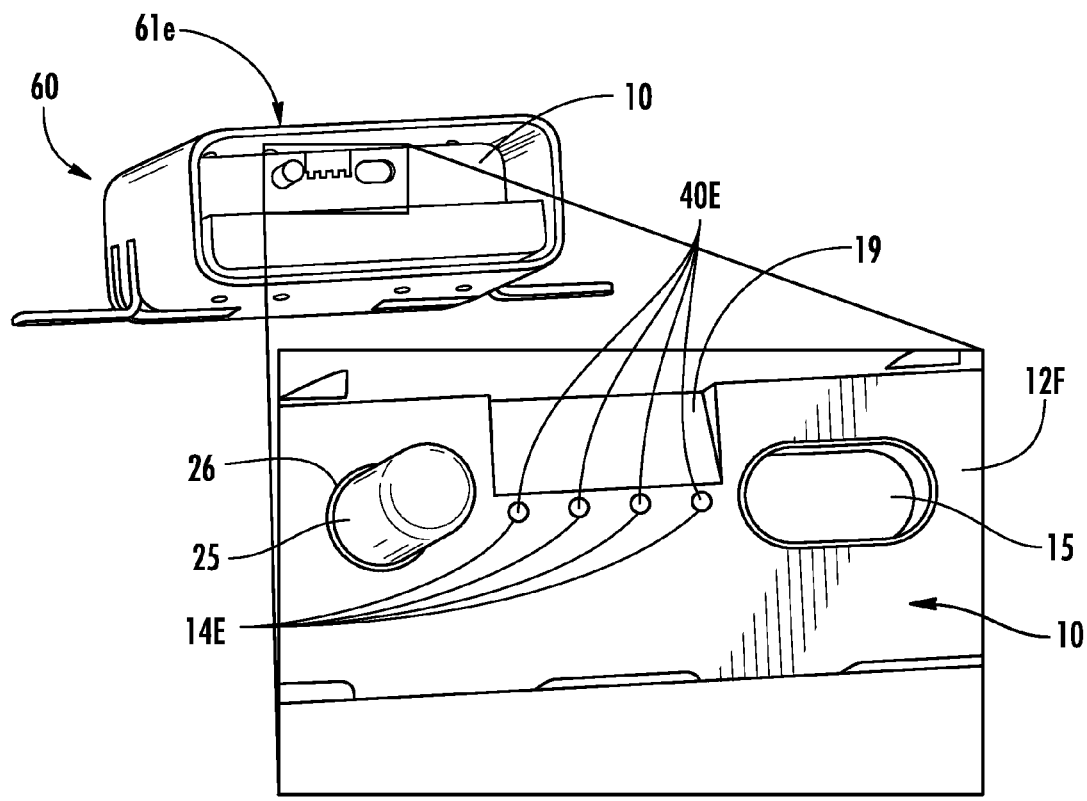
FIG. 11 is an isometric end view of another fiber optic ferrule having both female and male mating geometry according to the concepts disclosed herein.
Figure 26:
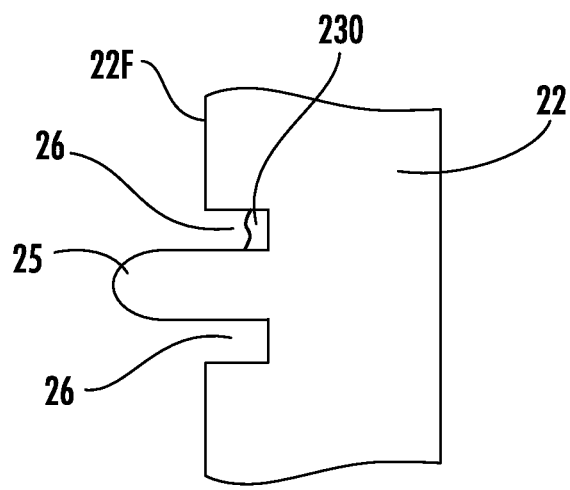
FIG. 26 is a partial cross-sectional close-up view of the plug ferrule of the plug of FIG. 25, showing the guide pin and surrounding trench recess.

Another type of recess 26 that mitigates adverse effects from contaminants is in the form of a trench such as shown in FIG. 11 and as discussed below in connection with FIG. 26. Additionally, the ferrules disclosed herein may also provide electrical connections in addition to optical connections, thereby providing a hybrid connection. Example ferrules that support both optical and electrical connections are described below. The fiber optic interface devices disclosed herein may thus have either optical connection capability or both optical and electrical connection capability, and both types of fiber optic interface devices are referred to herein as optical fiber optic interface devices for ease of explanation.

First and second ferrules 10 and 20 may also include an angled portion 19 adjacent optical pathways 14. Angled portion 19 allows for laser processing of the optical fibers 40 supported by first and second ferrules 10 and 20 in optical pathways 14. Specifically, angled portion 19 aids manufacturing by providing a relief that inhibits marking and/or damage to the front end of the ferrule during laser processing of optical fibers 40 supported by optical pathways 14. Angled portion 19 is thus configured to inhibit the interaction between a laser beam LB and/or debris during cutting and/or polishing of the optical fibers 40 with the laser beam, thereby inhibiting marking and/or damage to the front end 12F of ferrule 10 (see FIG. 1A).

As shown in FIG. 1A and FIG. 2, angled portions 19 can include a surface that is angled with respect to the longitudinal axis of the ferrules 10 and 20. Angled portion 19 can have any suitable angle and/or geometry such as between 30 to 45 degrees from the front face, but other suitable angles/geometry are possible. Further, angled portion 19 can start at any suitable distance from optical pathways 14, so long as the dimensions and the structural integrity of the ferrule are preserved.

In other variations, angled portion 19 can also be optionally recessed rearward from the front surface of the ferrule having the optical pathways 14. By way of example, a shoulder can be formed adjacent to angled surface 19, thereby permitting the angled surface to be recessed rearward from the front surface of the ferrules. For instance, the shoulder can have a depth of about 2 microns or greater from the front surface of the ferrule (e.g., ferrule body front end 22F).

Since ferrules 10 and 20 include angled portion 19, processing the plurality of optical fibers 40 supported by the ferrule may include cutting and/or polishing the plurality of optical fibers with laser beam LB in one or more steps (see FIG. 1A). For instance, separate steps may be used for cutting and polishing optical fibers 40 with laser beam LB, but cutting and polishing may also occur in one step with the laser beam. Any suitable type of laser and/or mode of operation for generating laser beam LB can be used.

By way of example, the laser for generating laser beam LB may be a $CO_2$ laser operating in the pulse, continuous, or other suitable mode. The angle between laser beam LB and optical fibers 40 may also be adjusted to produce the desired angle on the ends of optical fibers 40, such as 12 degrees, 8 degrees, or flat. Due to the distance between the portion of ferrule body front end 12F that includes the bores and the outboard portions of the front end, laser beam LB substantially avoid interaction with the ferrules 10 and 20 during cutting and polishing of the plurality of optical fibers 40.

Optional angled portion 19 is provided to further reduce the probability of interaction between refracted portions of laser beam LB, any debris and the ferrules. For instance, laser beam LB may be aligned to cut and/or polish the plurality of optical fibers 40 in a general direction from the bottom of the ferrule 10 and 20 toward angled portion 19.

By way of example, suitable complementary structures that use first and second ferrules 10 and 20 include first and second fiber optic interface devices respectively configured in one example as a receptacle fiber optic interface device ("receptacle") 60 (see FIG. 6) and a plug fiber optic interface device ("plug") 70 (see FIG. 7) that allow the user to make a quick and reliable optical and/or hybrid connection (i.e., optical/electrical connection) therebetween. More specifically, first ferrule 10 and second ferrule 20 form portions of respective USB fiber optic interface device types that may optionally include respective electrical contacts 63 and 73 (see FIG. 6 and FIG. 7), or that alternatively may form a portion of optical USB fiber optic interface devices. In other words, in an example, plug 70 is configured as a USB plug fiber optic interface device and receptacle 60 is configured as a USB receptacle fiber optic interface device as shown.

Other details of first and second ferrules 10 and 20 are discussed below in combination with the receptacle 60 and plug 70 shown in FIGS. 6 through 10. The concepts of first and second ferrules are useful with other types of ferrule, fiber optic interface devices, and mating devices.

Example MTP-based Fiber Optic Interface Devices

Figure 4:
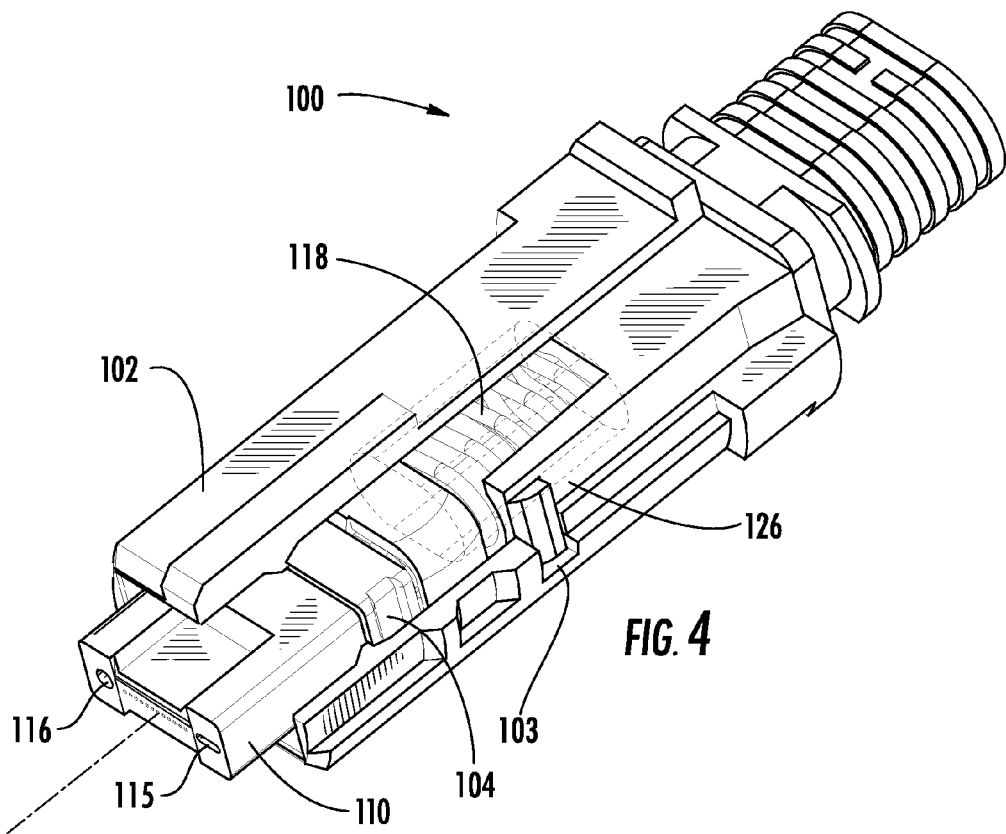
FIGS. 4 and 5 respectively are elevated isometric and exploded views of mating fiber optic interface devices using another style of complementary mating fiber optic ferrules with mating geometry similar to the fiber optic ferrules shown in FIGS. 1 through 3.
Figure 5:
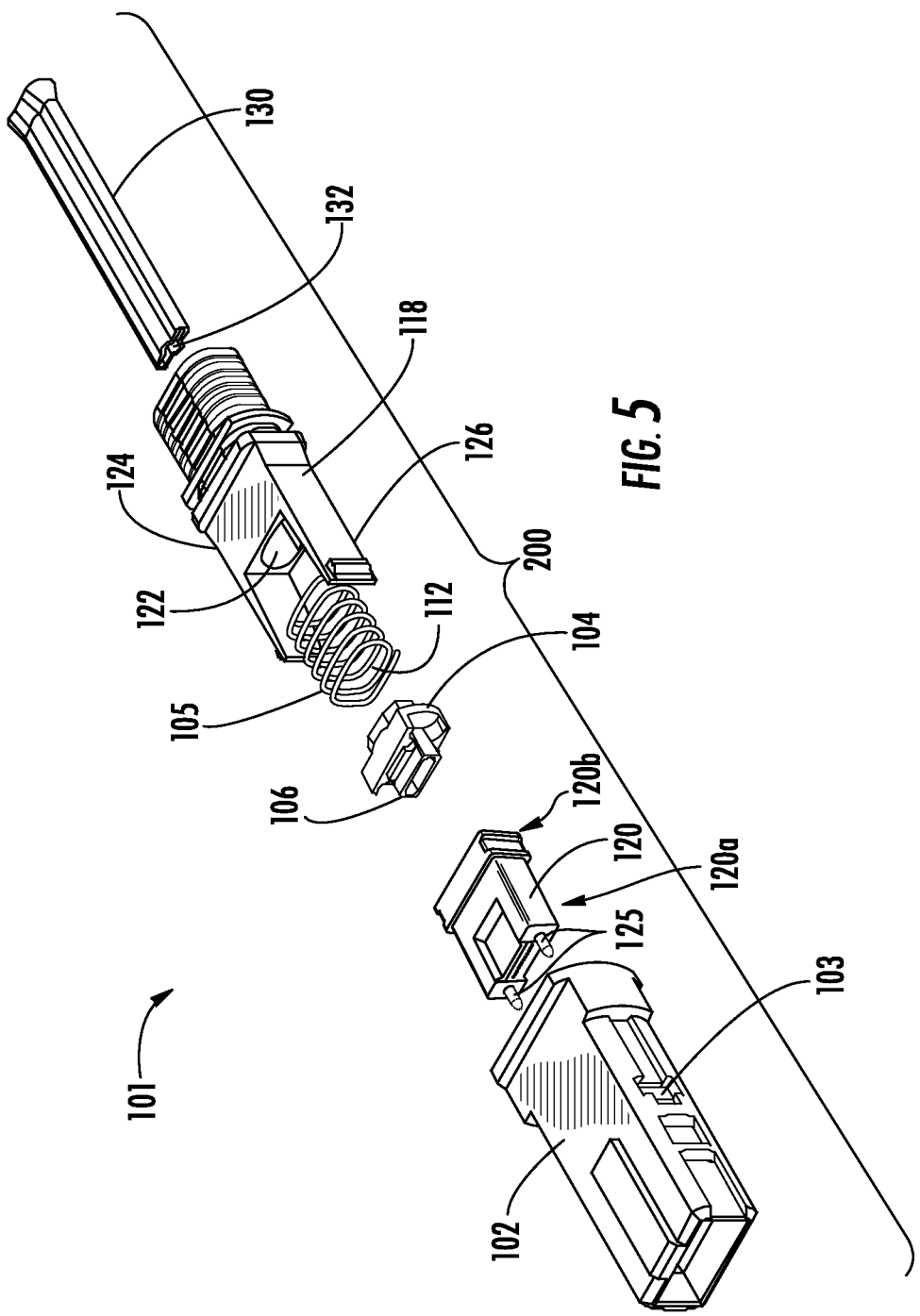

FIGS. 4 and 5 are respective elevated isometric and exploded views of respective examples of fiber optic interface devices 100 and 101 using another set of example first and second ferrules 110 and 120 having complementary MTP-based mating geometries. First ferrule 110 includes mating geometry having at least one slot 115 formed in a body 112 similar to ferrule 10 as part of the mating geometry. Likewise, second ferrule 120 includes mating geometry having at least one guide pin 125 monolithically formed with the body similar to ferrule 20 as part of the mating geometry. Mating first and second ferrules 110 and 120 are configured as a MPO type fiber optic interface device such as a MT fiber optic interface device that mate together using an adapter (not shown), but other fiber optic interface device configurations are possible using the concepts disclosed. Further, fiber optic interface devices 100 and 101 are part of a cable assembly having one or more optical waveguides such as optical fibers 40 (not shown for clarity) inserted into the bores of ferrules. The fiber optic interface devices 100 and 101 are just examples of fiber optic interface devices and cable assemblies that can incorporate ferrules in accordance with the disclosed concepts.

More specifically, FIG. 4 illustrates an isometric view of an assembled fiber optic interface device 100, while FIG. 5 illustrates an exploded view of a similar fiber optic interface device 101. Like parts in fiber optic interface devices 100 and 101 are represented by like reference numbers. Fiber optic interface device 100 may optionally comprise a spring seat 104, a coil spring 105, a spring push 118, a lead-in tube 130 and a generally hollow fiber optic interface device housing 102. The optional spring seat 104 of the example embodiment shown in FIG. 4, can be positioned adjacent the rear face of the rear end of ferrule 110, adjacent the ferrule and the coil spring 105. An opening 106 extending lengthwise through the spring seat 104 can be configured to permit the lead-in tube 130 and the end portions of the optical waveguides (not shown) to pass through the spring push 118 to the rear face of ferrule 110. The lead-in tube 130 can be positioned within an opening 122 of the spring push 118, an opening 112 of the coil spring 110 and the opening 106 of the spring seat 104. An opening 132 extending lengthwise through the lead-in tube 130 receives and guides the end portions of the optical fibers of the fiber optic cable in respective bores of the respective ferrule.

Fiber optic interface device 100 can include alignment and/or attachment structure for mating and securing the same within an adapter (not numbered). As shown, the ferrule 110, the spring seat 104, the coil spring 105, a forward portion 124 of the spring push 118 and the lead-in tube 130 can be positioned at least partially within the fiber optic interface device housing 102. In one example, a flexible latch, e.g., a latch with projection in the form of arms 126 provided on spring push 118, can extend lengthwise from the forward portion 124 to engage openings 103 formed in the fiber optic interface device housing 102 for securing the spring push 122 with the fiber optic interface device housing 102. A forward mechanical stop (not visible) can be provided on the interior surface of the fiber optic interface device housing 102 so that the ferrule 110 is movable when the disposed within the fiber optic interface device housing 102, but retained therein. The ferrule 110 is biased in the forward direction by the coil spring 105 and the spring seat 104.

Fiber optic interface device 101 of FIG. 5 has a similar construction to fiber optic interface device 100, but includes ferrule 120 instead of ferrule 110, thereby providing a cable assembly suitable for mating with fiber optic interface device 100.

First Examples of USB-based Fiber Optic Interface Devices

Figure 6:
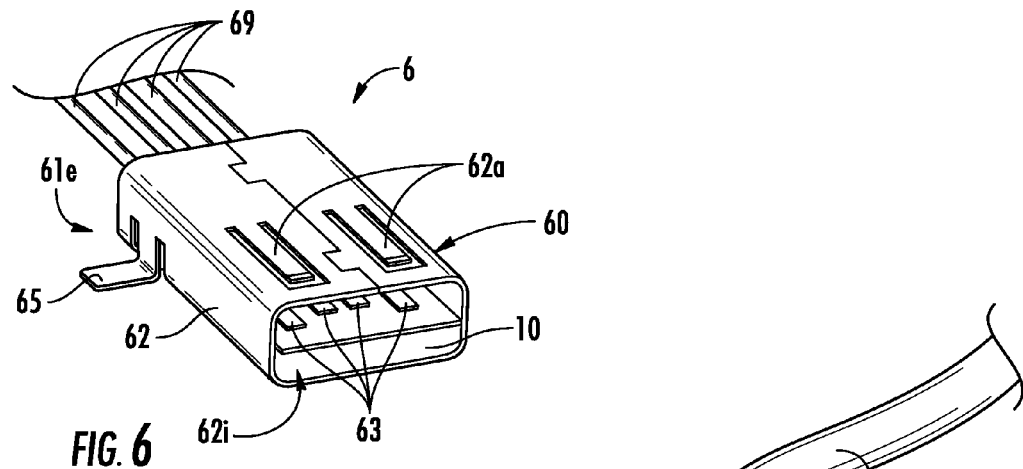
FIGS. 6 and 7 are elevated isometric views that respectively depict exemplary receptacle and plug fiber optic interface devices that respectively use the first and second example ferrules depicted in FIG. 1A, FIG. 2 and FIG. 3 and form a portion of a cable assembly.
Figure 7:
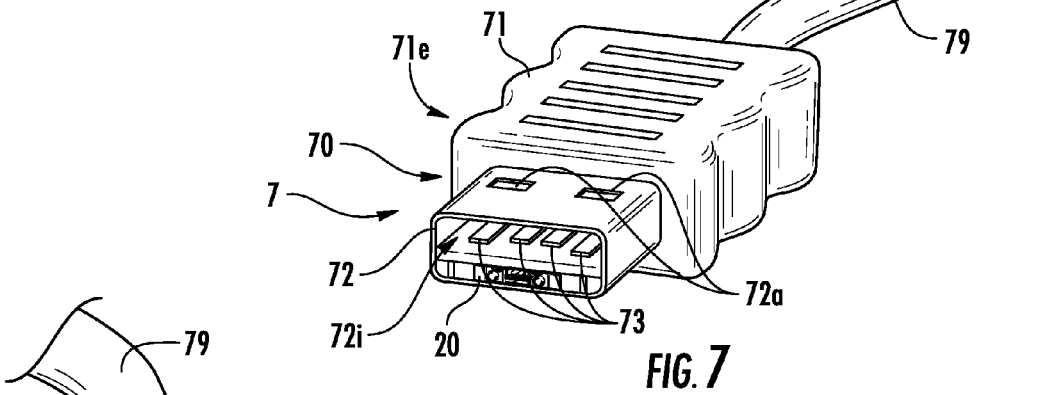
Figure 8:
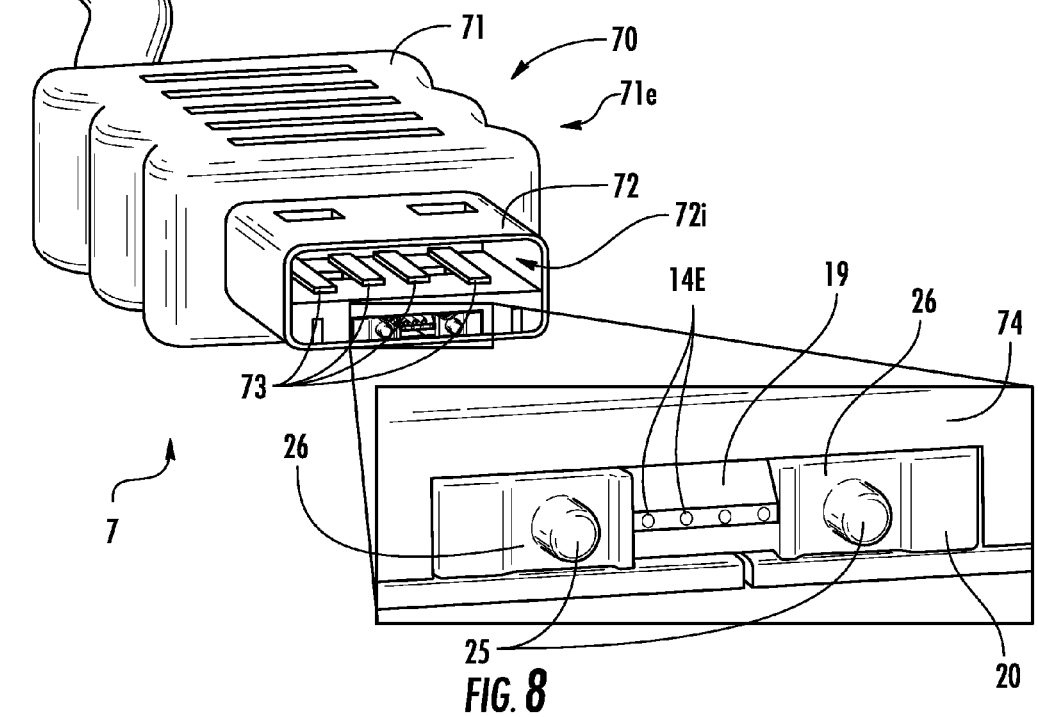
FIG. 8 is a front-end isometric view of the plug fiber optic interface device of FIG. 7 along with a close-up view showing the details of the plug fiber optic interface device.
Figure 9:
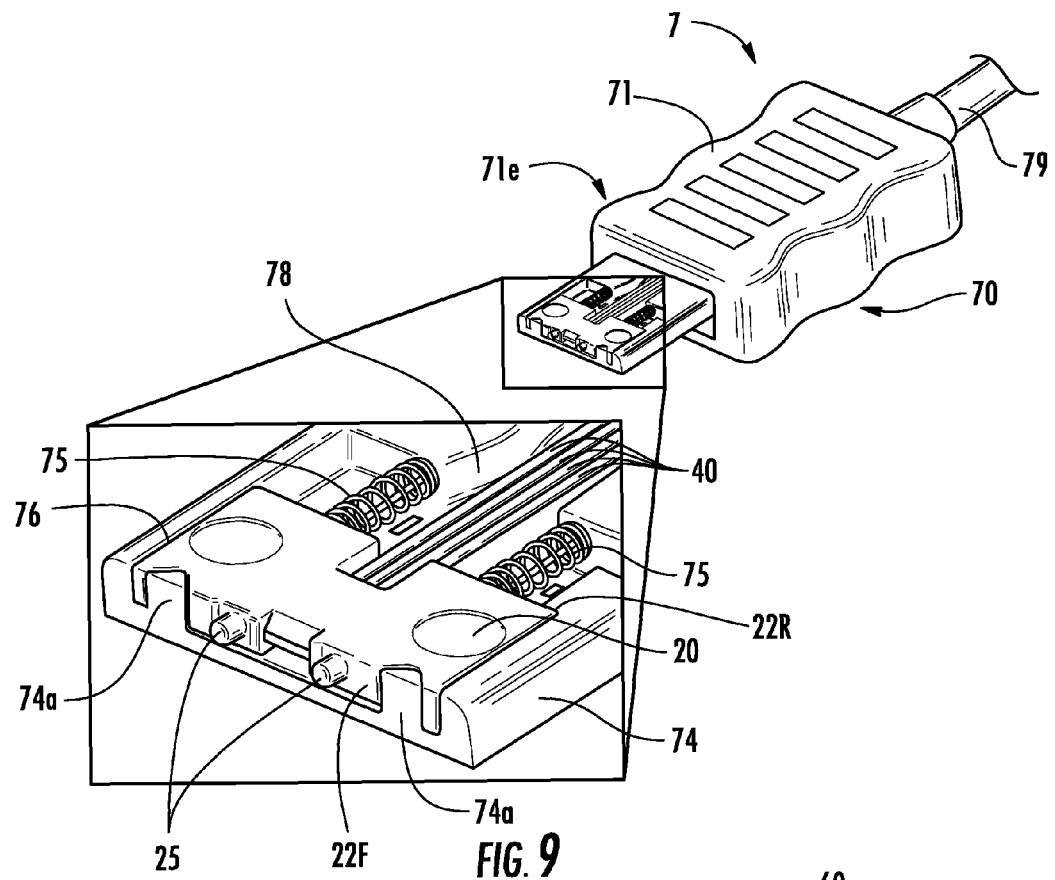
FIG. 9 is a elevated isometric view of the plug fiber optic interface device of FIGS. 7 and 8 with the shroud removed along with a close-up view showing details of the plug fiber optic interface device.
Figure 10:
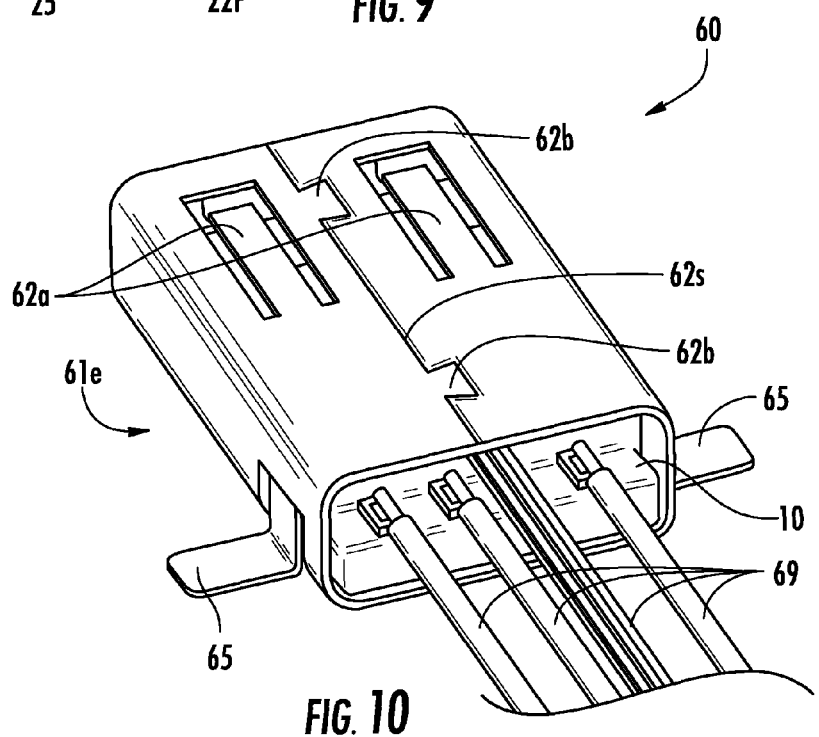
FIG. 10 is an elevated rear isometric view of the receptacle of FIG. 6 showing the electrical connections.

FIGS. 6 through 10 are elevated isometric views that respectively depict first examples of USB-based fiber optic interface devices that respectively use the first ferrules 10 as depicted in FIG. 1A and the second ferrule 20 as depicted in FIG. 2 and FIG. 3. Specifically, FIGS. 6 and 10 depict a receptacle 60, and FIG. 7 through FIG. 9 depict a plug 70. Receptacle 60 is attached to a cable 69 thereby forming a receptacle cable assembly 6, while plug 70 is connected to a cable 79, thereby forming a plug cable assembly 7. Receptacle 60 and plug 70 mate directly together in one relative orientation and by being urged together, form an optical connection or an optical and electrical connections therebetween. Although, ferrules 10 and 20 are depicted as portions of receptacle 60 and plug 70, the ferrules or variations thereof may be used with other types of fiber optic interface devices, such as fiber optic interface devices that are solely optical.

Receptacle 60 includes first ferrule 10 at least partially disposed within an interior 62i of an enclosure 61e, which in an example is in the form of a shroud 62, as shown in FIGS. 6 and 10. In an example, shroud 62 is a cylindrical metal shell with a substantially rectangular cross-section. Receptacle 60 is configured as USB fiber optic interface device. Specifically, receptacle 60 in the instant example is backward compatible with USB plugs that only have electrical connections and may be used with suitable USB plugs that have optical connections or both optical and electrical connections.

Specifically, receptacle 60 also includes a plurality of electrical contacts 63 for making electrical connections with electrical contacts 73 of plug 70. Electrical contacts 63 may be molded with ferrule 10 so that they are slightly protruding or relatively flush with a wiping surface of the ferrule (i.e., the horizontal surface of the ferrule that includes the electrical contacts) or have other suitable attachment means. Receptacle 60 has transmission elements 69 (e.g., both electrical wire and optical fibers) that are routed to the rear of the fiber optic interface device for making electrical connections with the electrical contacts 63 or routed to the plurality of optical pathways 14 of ferrule 10. In an example, transmission elements 69 collectively constitute a cable and so are also referred to herein as cable 69.

Shroud 62 also includes tabs 65 for securing and/or grounding receptacle 60 to a circuit board or the like. As best shown in FIG. 10, shroud 62 includes a plurality of latching arms 62a for securing the plug with the receptacle 60 when mated together. Although not visible, a second set of latching arms 62a is disposed on the lower surface of shroud 62. As shown, latching arms 62a are cantilevered but can have other suitable constructions or can be omitted altogether. Further, as illustrated in FIG. 10, an example shroud 62 is formed from two halves, and locking tabs 62b are used to secure the two halves at a seam 62s.

FIG. 7 through FIG. 9 are front-end elevated isometric views of an example plug 70 suitable for mating with receptacle 60. Plug 70 includes an enclosure 71e comprising a housing 71 and a shroud 72 operably connected to an end of the housing. Enclosure 71e defines an interior 72i. Plug 70 also includes the aforementioned second ferrule 20 being at least partially disposed within the portion of interior 72i defined by shroud 72. Shroud 72 is similar to but fits within receptacle shroud 62. FIG. 8 includes a close-up view showing ferrule 20 disposed within a plug ferrule guide 74, and FIG. 9 shows plug 70 with the shroud 72 removed to show ferrule 20 in cooperation within ferrule guide 74.

Thus, example plug 70 includes ferrule 20, enclosure 71e comprising a housing 71 and a shroud 72, electrical contacts 73, ferrule guide 74, a pair of resilient members 75 for biasing ferrule 20 forward. Like receptacle 60, the example plug 70 is configured as USB fiber optic interface device, but other types of fiber optic interface devices are possible with the concepts disclosed herein. Specifically, the example plug 70 is backward compatible with USB receptacles that only have electrical connections and may be used with suitable USB receptacles that have optical connections, or both optical and electrical connections. Specifically, plug 70 includes the aforementioned plurality of electrical contacts 73 for making electrical connection between the receptacle 60 and plug 70 (i.e., electrical connection with the corresponding electrical contacts 63 of receptacle 60).

As with receptacle 60, electrical contacts 73 may be molded with ferrule 20 so that they are relatively flush with a wiping surface of the ferrule (i.e., the horizontal surface of the ferrule that includes the electrical contacts) or have other suitable attachment means. Plug 70 has transmission elements 79 (i.e., both electrical wire and optical waveguides) that are routed to the rear of the fiber optic interface device for making electrical connection with the electrical contacts 73 or routed to the plurality of optical pathways 14 of ferrule 20 as shown. In an example, transmission elements 79 collectively constitute a cable and so are also referred to herein as cable 79.

The close-up view of FIG. 9 depicts ferrule 20 disposed within an opening 76 of plug ferrule guide 74 and biased to a forward position by one or more resilient members 75. As shown, ferrule guide 74 includes a channel 78 connected to opening 76 that leads to ferrule body rear end 22R to provide a passageway for routing optical waveguides (i.e., transmission elements) of cable 79 to ferrule 20. In this embodiment, resilient members 75 are coil springs, but other suitable resilient members such as leaf springs or the like are possible.

As best shown in FIG. 2, ferrule 20 includes retention features 27 on opposite sides of the plurality of optical pathways 14. As depicted, retention features 27 are protrusions that seat resilient members 75 to ferrule body rear end 22R. Additionally, plug ferrule guide 74 includes protrusions or the like (not shown) for seating the second end of resilient members 75. Plug ferrule guide 74 also includes ferrule stops 74a for limiting the travel of ferrule 20 within ferrule guide opening 76. Ferrule stops 74a have a shape and position that is complementary to stops 28' on ferrule 20 (see FIG. 2). Additionally, ferrule stops 74a and stops 28 have complementary angled surfaces to help center the ferrule 20 with opening 76 of plug ferrule guide 74 and inhibit undue sideways displacement.

When shroud 72 is installed, ferrule 20 is trapped between plug ferrule guide 74 and shroud 72 as shown in FIGS. 7 and 8. Shroud 72 also includes a plurality of windows 72a for cooperating with latching arms 62a of receptacle 60 for securing the plug 70 to receptacle 60 when mated. Further, the opposite side of plug ferrule guide 74 is used for mounting electrical contacts 73 thereto as depicted.

Additionally, first ferrule 10 can have other mating geometries while still using the slot configuration is disclosed herein. By way of example, FIG. 11 depicts an example receptacle 60 having a ferrule 10 similar to that described above but that includes a mating geometry with slot 15 and a guide pin 25 disposed on opposite sides of optical pathways 14. In other words, the example ferrule 10 of FIG. 11 has a female portion and a male portion rather than two female portions. The concept of using a female slot portion and a male pin on the same ferrule may be used with any suitable ferrule and/or fiber optic interface device design. FIG. 11 also illustrates optical fiber ends 40E residing at optical pathway ends 14E.

Figure 12:
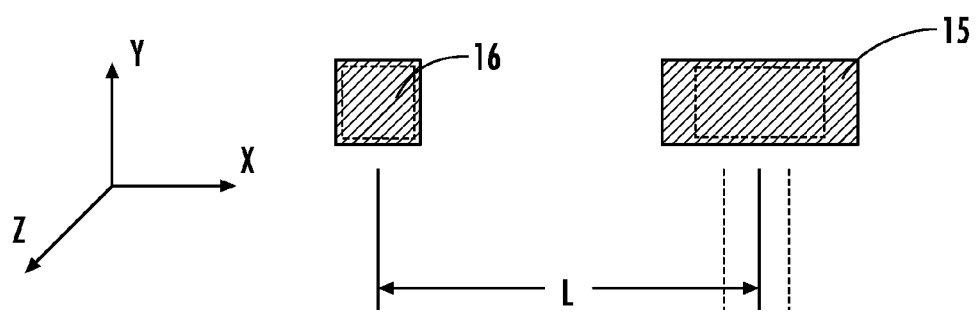
FIG. 12 is a schematic representation showing the different shapes for the mating geometry.

Moreover, as stated above, the mating geometry can have shapes other than round. Illustratively, FIG. 12 is a schematic representation showing a non-round complementary mating geometry with a slot 15 and a rectangular shaped hole 16 for the first ferrule. Second ferrule 20 has a complementary mating geometry configured as rectangular guide pins sized and shaped for mating with slot 15 and hole 16. Using a mating geometry with flat surfaces may reduce forces between the mating geometries of the two confronting ferrules. In other words, the force is spread over a larger surface with the flat surfaces (i.e., squares and rectangles) compared with a line contact created by round geometry. Thus, the use of flat surfaces may reduce wear and debris formation. Moreover, the use of flat surfaces can increase the stability along a weak axis between the ferrules. Stated differently, the connection stability may be improved because a greater volume of material must be deformed with the flat surfaces before inducing an angle between the ferrules along the weak axis (i.e., bending about the centerline of the pin).

Examples of USB-based Fiber Optic Interface Devices

As discussed above, there is an increasing need for fiber optic interface devices suitable for use with electronic devices such as consumer electronic devices, which are often operated in a multitude of environments where contaminants in the form of dirt, dust, and other debris are encountered on a regular basis. Such contaminants can adversely affect the ability of fiber optic interface devices to optically or optically and electrically communicate with the electronic device. Thus, it advantageous to have optical fiber optic interface devices that are resistant to the adverse effects of contaminants and that can also be readily cleaned to maintain a substantially contaminant-free connection.

Figure 13:
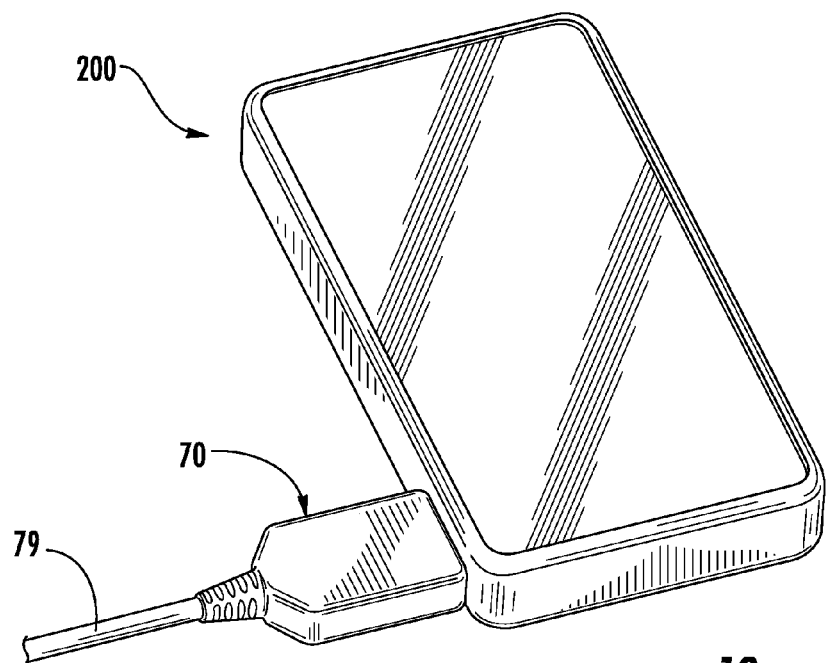
FIG. 13 is a top-down isometric view of an example hand-held consumer electronic device to which is operably connected an example plug fiber optic interface device.
Figure 14:
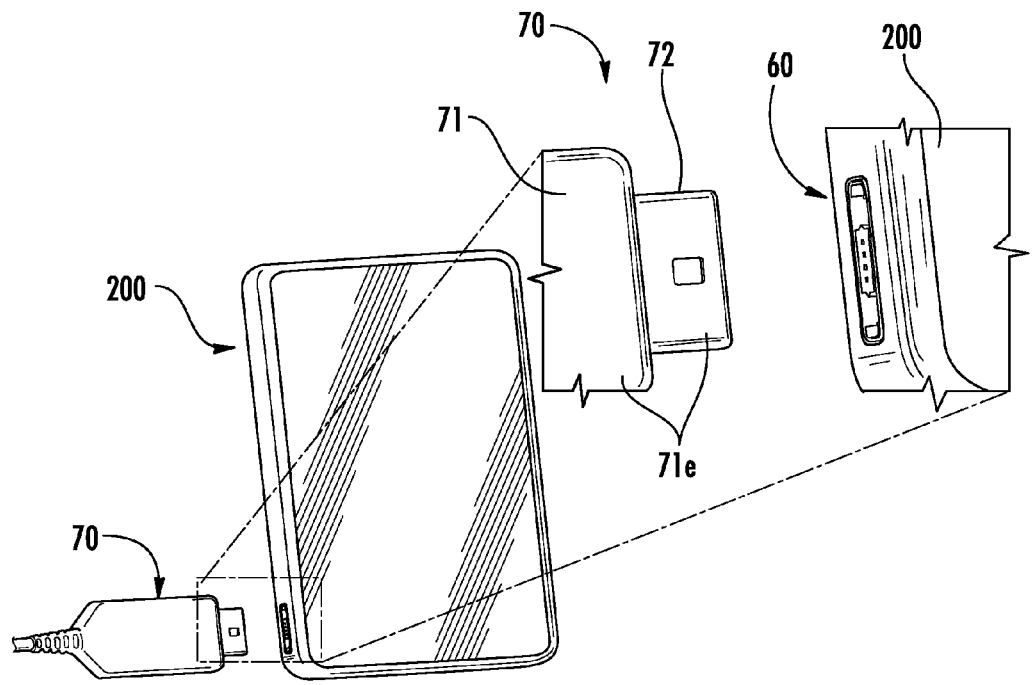
FIG. 14 is similar to FIG. 13 and shows the plug fiber optic interface device disconnected from the consumer electronic device, which includes a receptacle fiber optic interface device that resides within the consumer electronic device.

FIG. 13 is a top-down isometric view of an example handheld electronic device 200 to which is operably connected an example plug fiber optic interface device 70 at a receptacle 60. FIG. 14 is similar to FIG. 13 and shows plug fiber optic interface device (plug) 70 disconnected from electronic device 200. Electronic device 200 includes an example receptacle fiber optic interface device (fiber optic interface device) 60, which resides within the consumer electronic device, as best seen in the inset of FIG. 14.

Figure 15:
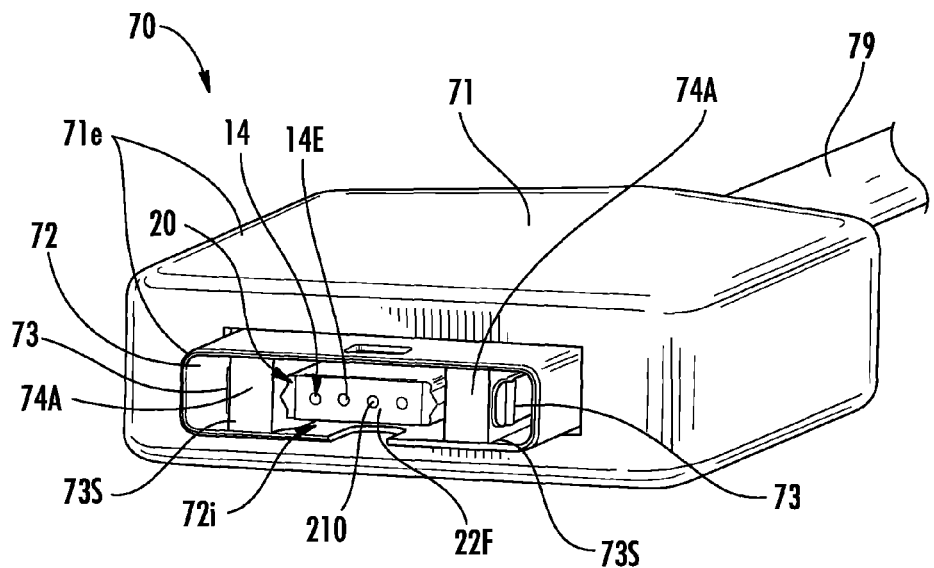
FIG. 15 and FIG. 16 are respective front elevation views of the example receptacle and plug fiber optic interface devices of FIG. 14.
Figure 16:
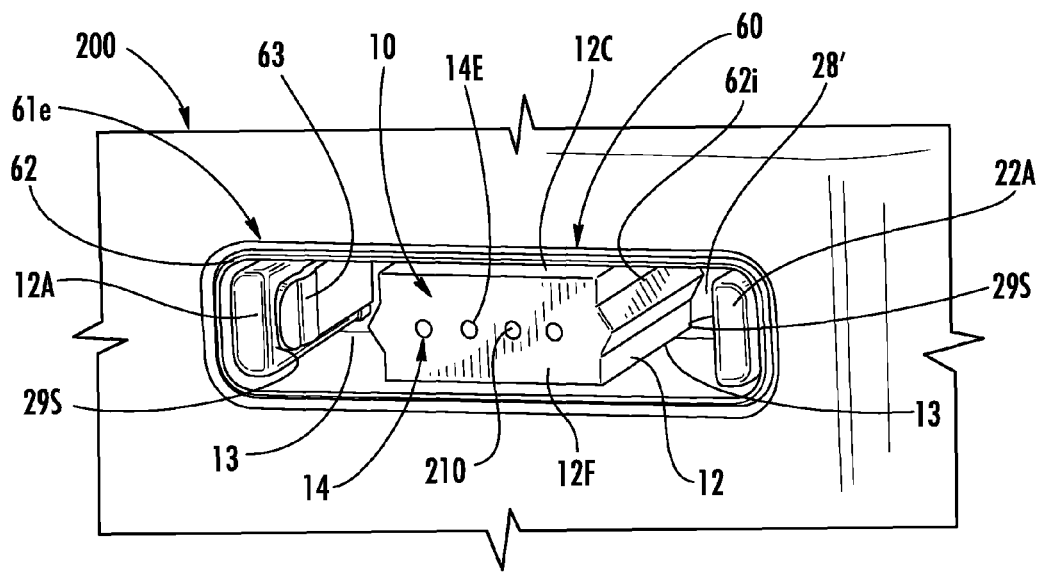

FIG. 15 and FIG. 16 are respective front elevation views of plug 70 and receptacle 60. Plug 70 includes the aforementioned enclosure 71e comprising housing 71 and a shroud 72. Plug ferrule 20 is movably supported by a plug ferrule guide 74. Electrical contacts 73 are disposed on respective outer sides 74S of each of two arms 74A of plug ferrule guide 74. In an example, optical pathways 14 include gradient-index (GRIN) lens elements 210 disposed therein and supported at ferrule body front end 22F.

Receptacle fiber optic interface device 60 includes ferrule 10, wherein ferrule body 12 of ferrule 10 has arms 12A, a central body portion 12C and stops 28' configured to receive ferrule guide arms 74A. Arms 12A and central ferrule body portion 12C define slots 13, with the arms each having inner sides 29S on which are disposed electrical contacts 63. Receptacle and plug fiber optic interface devices 60 and 70 are configured to mate so that the plug and receptacle optical pathways 14 are aligned and in optical communication via GRIN lens elements 210, and so that the receptacle and electrical contacts 63 and 73 are in electrical contact with each other. Receptacle fiber optic interface device 60 includes an enclosure 61e in the form of a shroud 62. In an example, enclosure 61e is configured to compel alignment of receptacle ferrule 10 and plug ferrule 20 and to avoid stubbing. Other mating geometries may be used, such as tongue-and-groove, so that receptacle and plug ferrules 10 and 20 are registering front ends 12F and 22F.

In the example shown in FIG. 15 and FIG. 16, receptacle ferrule front end 12F and plug ferrule front end 22F are essentially planar, i.e., they have no pins, holes or slots, except for the ends 14E of optical pathways 14. This allows for these ferrule front ends to be readily cleaned of contaminants while in the unretracted position.

Figure 17:
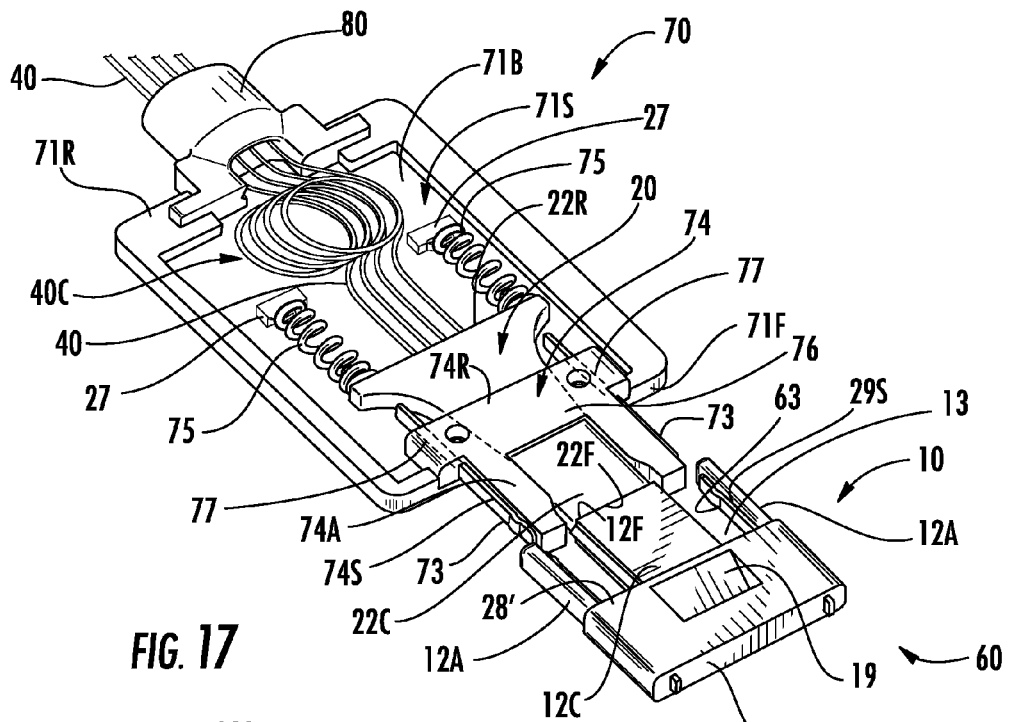
FIG. 17 is a cut-away, elevated isometric view of example USB-based receptacle and plug fiber optic interface devices in the process of being mated, with just the plug ferrule shown for plug fiber optic interface device for ease of illustration.
Figure 18:
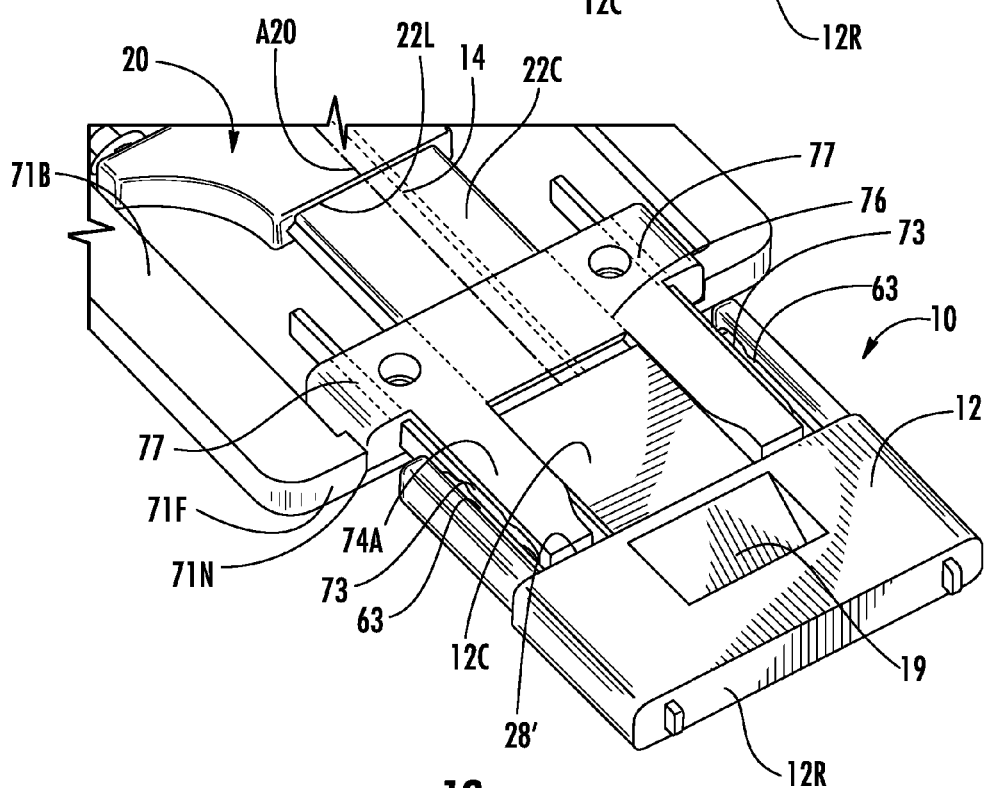
FIG. 18 is a close-up view of the receptacle and plug ferrules of FIG. 17, with the receptacle and plug fiber optic interface devices in the mated state.
Figure 19:
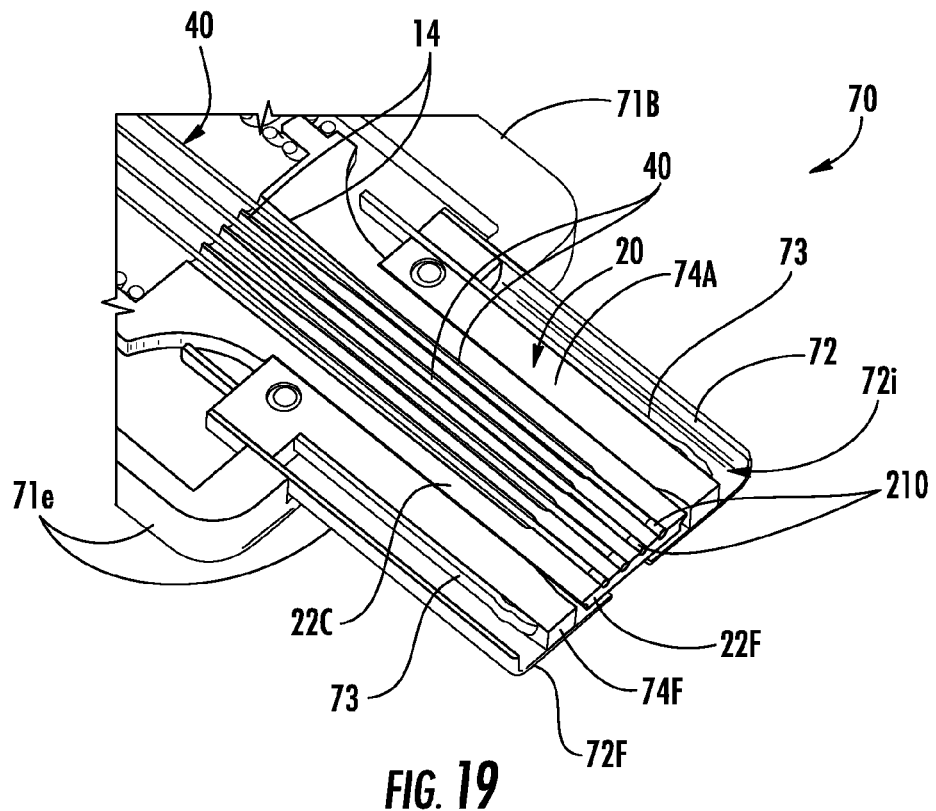
FIGS. 19 and 20 are close-up, cut-away elevated isometric views of the ferrule guide and ferrule of the receptacle fiber optic interface device in the unretracted and retracted states, respectively.
Figure 20:
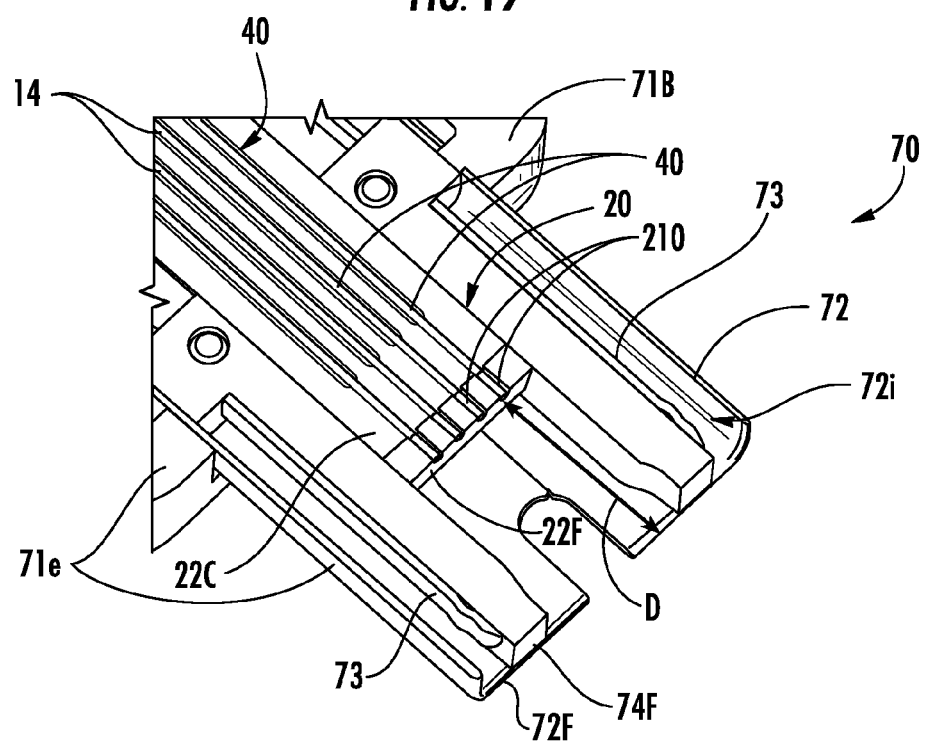

FIG. 17 is a cut-away, elevated isometric view of receptacle and plug fiber optic interface devices 60 and 70 in the process of being mated, with just receptacle ferrule 10 of receptacle 60 shown for ease of illustration. FIG. 18 is a close-up view of the receptacle and plug ferrules 10 and 20 of FIG. 17, but with the receptacle and plug fiber optic interface devices 60 and 70 in the mated state. A single one of the optical pathways 14 in the plug ferrule 20 is shown in phantom in FIG. 18 by way of illustration. FIGS. 19 and 20 are close-up, cut-away elevated isometric views of plug ferrule guide 74 and plug ferrule 20 of plug 70 in the unretracted and retracted states, respectively. Plug ferrule 20 has a front end 22F, a rear end 22R and a lip 22L between the front and rear ferrule ends.

With reference to FIGS. 17 and 18, plug 70 is shown with the shroud 72 and the top portion of housing 71 removed, leaving just a bottom housing portion 71B that has a front end 71F and a rear end 71R. Bottom housing portion 71B includes at least one retention feature 27. A plug ferrule guide 74 is disposed at front end 71F of bottom housing portion 71B in a cut-away portion (niche) 71N formed therein. Plug ferrule guide 74 has a central opening (slot) 76 sized to slidingly engage a central portion 22C of plug ferrule 20. Plug ferrule guide 74 has side slots 77 on either side of central slot 76 that support respective plug electrodes 73.

At least one resilient member 75 operably resides between the at least one retention member 27 and plug ferrule rear end 22R, and rests upon housing bottom portion 71B. Four optical fibers 40 are shown as passing through a rear fiber guide 80 at housing rear end 71R and to optical pathways 14. Optical fibers 40 have a coiled or otherwise slack section 40C comprising excess optical fiber portions that resides in a storage region (space) 71S on bottom housing portion 71B and adjacent housing rear end 71R. In an example, storage region (space) 71S is formed by receptacle housing bottom portion 71B being extended relative to a conventionally sized USB receptacle fiber optic interface device.

In an example, plug ferrule 20 has a flared rear end 22. This feature allows for resilient members 75 to be arranged outboard of a plug ferrule central axis A20 so that optical pathways 14 can be located on or about the plug ferrule central axis. This feature also provides clearance for optical fibers 40.

FIG. 17 shows receptacle and plug fiber optic interface devices 60 and 70 just prior to their being mating engaged, so that resilient members 75 are substantially relaxed (e.g., at most slightly compressed), with plug ferrule front end 22F residing in substantially the same plane as the front ends 74F of guide arms 74A and contacting receptacle ferrule front end 22F. Plug ferrule lip 22L is configured to butt up against plug ferrule guide rear end 74R to prevent plug ferrule front end 22F from extending beyond front ends 74F of plug ferrule guide arms 74A. Thus, FIG. 17 shows plug ferrule 20 in its forward-biased position.

FIG. 18 shows the receptacle and plug fiber optic interface devices 60 and 70 as matingly engaged so that resilient members 75 are substantially compressed due to the force of receptacle ferrule 10 being urged against plug ferrule 20, which slides within plug ferrule guide central slot 76 toward plug housing rear end 71R. Optical fibers 40, because they are coiled or otherwise are configured to have some slack, simply move as needed to accommodate the back and forth motion of plug ferrule 20. Thus, FIG. 18 shows plug ferrule 20 in its rear-biased position with resilient members 75 being compressed.

FIGS. 19 and 20 are close-up, cut-away elevated isometric views of the plug ferrule guide 74 and plug ferrule 20 of the plug fiber optic interface device 70 in the unretracted and retracted states, respectively. When matingly engaged, arms 74A of plug ferrule guide 74 fit within the corresponding slots 13 of receptacle ferrule 10, with the plug ferrule guide arm ends 74F abutting respective stops 28' on receptacle ferrule 10. Plug ferrule 20 axially translates by a distance D relative to the front ends 74F of arms 74A of plug ferrule guide 74 (i.e., from plug shroud front end 72F). When plug ferrule 20 is in the rear-biased position, distance D is $0.5 \text{ mm} \le D \le 20 \text{ mm}$, or preferably $4 \text{ mm} \le D \le 8 \text{ mm}$, and more preferably $5 \text{ mm} \le D \le 7 \text{ mm}$.

Figure 22:
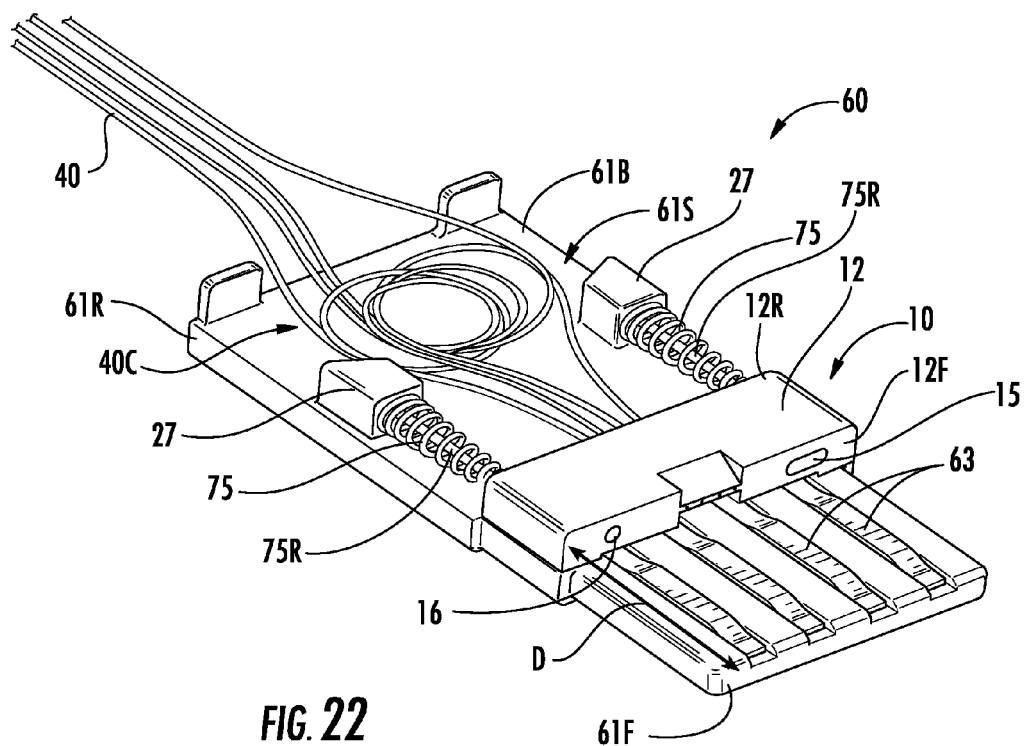
FIG. 22 is similar to FIG. 17 and illustrates another example embodiment of a USB-based receptacle fiber optic interface device.

Note that generally, distance D is measured from the front end 72F of enclosure 71e. In some cases, enclosure front end 72F corresponds to the plug shroud front end. In other cases, D is the distance measured from housing front end 61F, as shown in FIG. 22 and discussed below. Thus, distance D is the distance from the front end of the particular ferrule (e.g., either ferrule 10 or 20) to the front-most end of the particular structure in which the ferrule in question is contained, and the term enclosure is used in connection with distance D in this most general sense.

The translating configuration of plug ferrule 20 allows for the optical connection between respective optical waveguides 40 supported by the plug and receptacle optical interface devices to be established within plug shroud 72. This configuration serves to reduce the adverse effects of contamination by covering the optical interface between the plug and receptacle and also improves angle suppression. In addition, when there is no connection, plug ferrule front end 22F resides at or very near to plug shroud front end 72F so that it is thus readily available for cleaning (e.g., can be wiped clean using, for example a micro denier cleaning cloth). This further serves to reduce the adverse effects of contaminants on the optical connection (or the optical and electrical connections, as the case may be).

Figure 21:
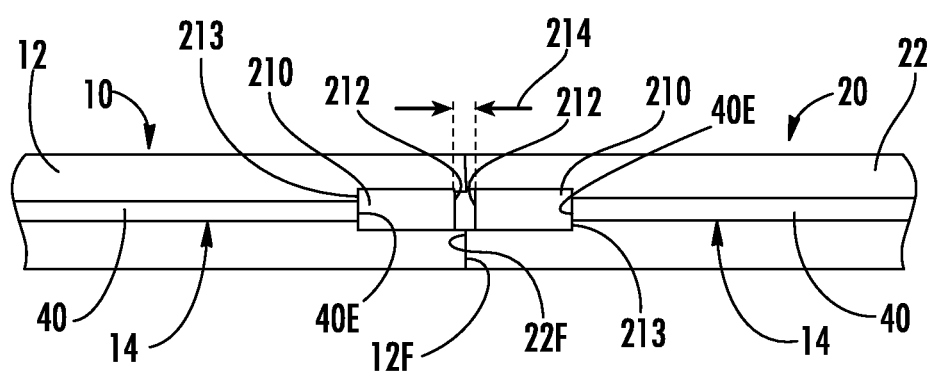
FIG. 21 is a close-up cross-sectional view of portions of the mated receptacle and plug fiber optic interface devices, illustrating an example where the gradient-index (GRIN) lens elements supported in the respective optical pathways are separated by a small gap when the receptacle and plug fiber optic interface devices are mated.

FIG. 21 is a close-up cut-away view of portions of the mated receptacle and plug fiber optic interface devices 60 and 70. The receptacle and plug ferrules 10 and 20 respectively support GRIN lens elements 210 within their respective optical pathways 14 and adjacent their respective ferrule front ends 12F and 22F. GRIN lens elements 210 have respective front surfaces 212 and rear surfaces 213. Optical fibers 40 are arranged in optical pathways 14 such that the respective optical fiber ends 40E interface with the rear surfaces 213 of GRIN lens elements 210. In an example, rear surfaces 213 of GRIN lens elements 210 are planar, as are optical fiber ends 40E.

It may be desirable that GRIN lens element front surfaces 212 do not contact another surface when one fiber optic interface device is mated to another fiber optic interface device. Thus, in an example, the GRIN lens elements 210 are arranged such that their front surfaces 212 are set back slightly (e.g., tens of microns) from their respective ferrule front ends 12F and 22F. This gives rise to a small gap 214 between the front surfaces 212 of the GRIN lens elements 210 when ferrule front surfaces 12F and 22F are in contact when the GRIN lenses confront each other, thereby avoiding lens surface contact. In an example, gap 214 has an axial dimension of between 25 microns and 100 microns. This spaced-apart configuration of the GRIN lens elements reduces the chances of damaging the GRIN lens element front surfaces 212 when mating the receptacle and plug fiber optic interface devices 60 and 70.

In another example, front surfaces 212 of the GRIN lens elements 210 are arranged with their respective front surfaces 212 residing in their respective plug and receptacle ferrule front ends 12F and 22F. To avoid the GRIN lens element front surfaces 212 from coming into contact, in an example at least one of the mated receptacle and plug fiber optic interface devices 60 and 70 can include a projecting feature (not shown).

Alternatively, the portion of the plug ferrule front end 12F that includes optical pathway ends 14E can be slightly set back from the rest of the ferrule front end so that the front surfaces 212 of the GRIN lens elements 210 can reside at the optical pathway ends but still remain slightly spaced apart from the opposing GRIN lens front surfaces 212 of receptacle ferrule 20 when plug and receptacle ferrule front surfaces 12F and 22F are otherwise in contact. This set back can also be included in front end 22F of receptacle ferrule 20, or each of the plug and receptacle ferrules 10 and 20 can include this set-back configuration.

More Examples of USB-based Fiber Optic Interface Devices

FIG. 22 is similar to FIG. 17 and illustrates another example embodiment of USB-based fiber optic interface devices where now receptacle 60 is configured with a translatable receptacle ferrule. Thus, the configuration of receptacle 60 in this example resembles that of plug 70 described above in connection with FIGS. 13 through 20.

Figure 23:
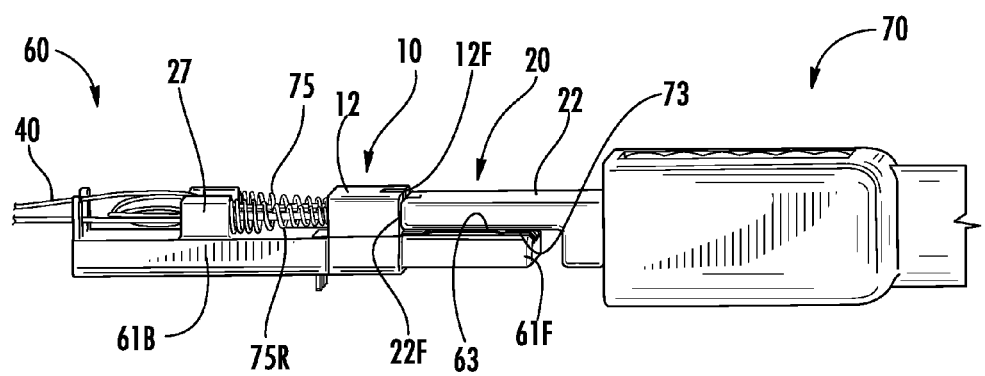
FIG. 23 that shows the receptacle fiber optic interface device of FIG. 22 engaged with a plug fiber optic interface device.

Receptacle 60 is shown in FIG. 22 with its receptacle ferrule 10 in the retracted (rear-biased) position. Note that receptacle ferrule front end 12F has the aforementioned associated distance D from housing front end 61F similar to that discussed above in connection with plug 70. The side view FIG. 23 shows the receptacle engaged with a plug 70. Receptacle 60 includes multiple electrical contacts 63 supported by receptacle housing bottom portion 61B adjacent housing front end 61F. The plug and receptacle 60 and 70 are an example of a pin-aligned USB fiber optic interface device assembly configuration. Housing bottom portion 61B also includes the aforementioned storage region (space) 61S where extra lengths of optical fiber 40 can be stored in coiled or otherwise slack form.

When receptacle 60 and plug 70 are mated, receptacle ferrule front end 12F contacts plug ferrule front end 22F. Because receptacle ferrule 10 is configured to be translatable, it is pushed back into the retracted position by the axial force of the plug ferrule on the receptacle ferrule as the receptacle and plug are brought together. Note that the receptacle and plug shrouds 62 and 72 are omitted from FIG. 22 and FIG. 23 for ease of illustration. In operation, receptacle shroud 62 serves as a receptacle ferrule guide that assists in guiding and containing plug ferrule 20.

Figure 24A:
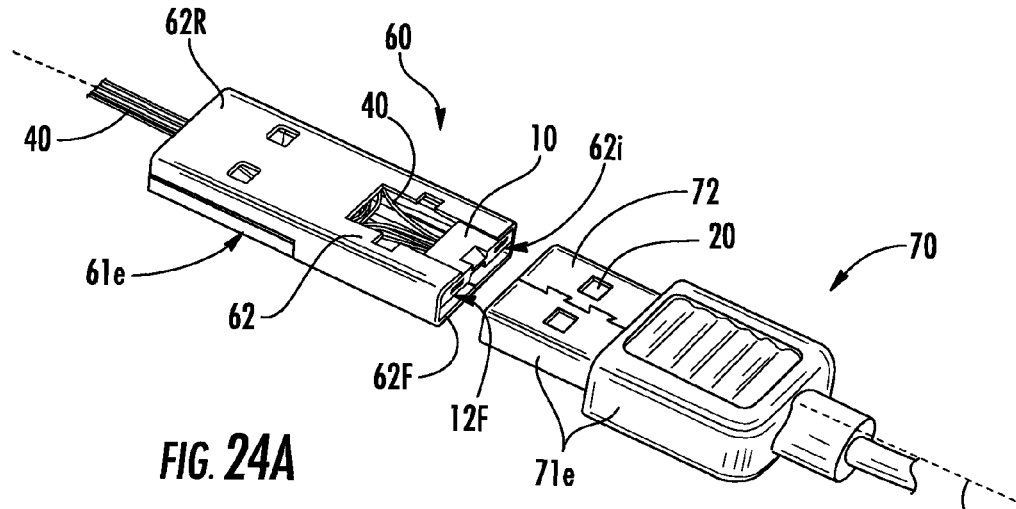
FIGS. 24A through 24C are top-down isometric views of the receptacle and plug fiber optic interface devices illustrating different phases of the receptacle-plug mating operation.
Figure 24B:
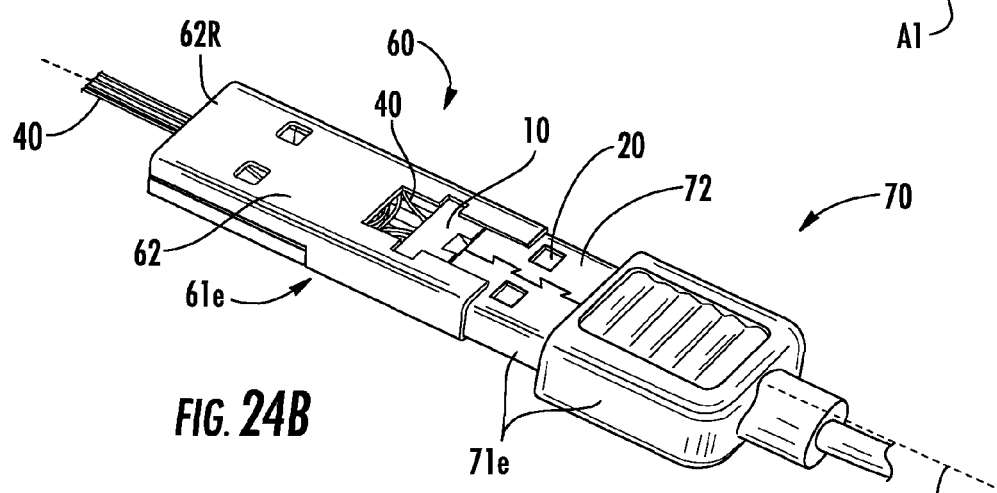
Figure 24C:
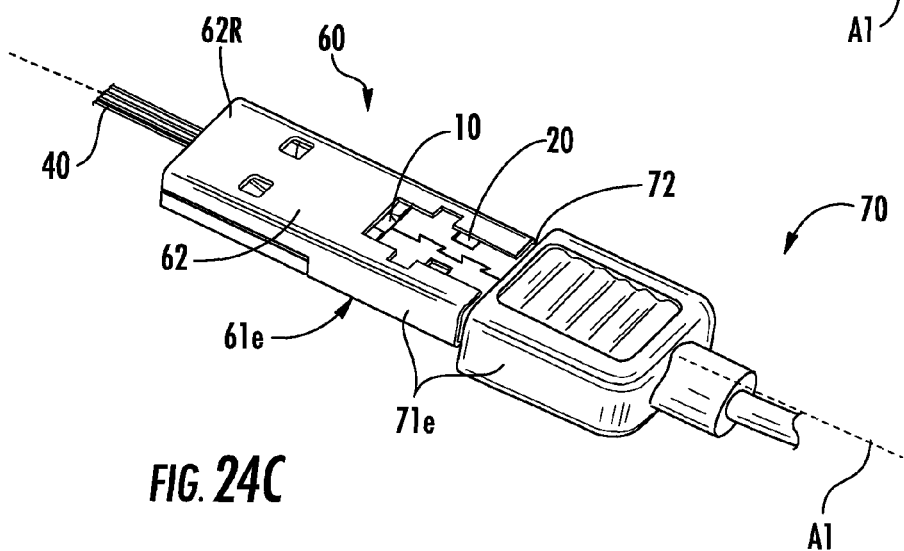

FIGS. 24A through 24C are top-down isometric views of receptacle 60 and plug 70, illustrating different phases of the receptacle-plug mating operation. In FIG. 24A, receptacle 60 and plug 70 are arranged in opposition to each other along a common axis A1 prior to the mating operation. In this relative position, receptacle ferrule 10 is in the unretracted (forward-biased) position and is adjacent front end 62F of receptacle shroud 62. This position allows for cleaning of receptacle ferrule body front end 12F if desired. Such cleaning, for example, removes contaminants from the ends 40E of optical fibers 40 or the end faces 212 of GRIN lens elements 210, depending on the particular receptacle configuration.

In FIG. 24B, plug shroud 72 is inserted into receptacle shroud 62. As receptacle 60 and plug 70 are urged together along axis A1, and plug shroud 72 slides within receptacle shroud 62, plug ferrule 20 pushes against the receptacle ferrule 10, causing the latter to slide axially in the direction of shroud rear end 62R as resilient members 75 are compressed. FIG. 24C represents the final mated position where receptacle ferrule 10 is in its fully retracted (i.e., rear-biased) position, with plug shroud 72 substantially fully surrounded by receptacle shroud 62.

In an example, resilient members 75 (see, e.g., FIG. 22) are configured (e.g., as a frustoconical spring) to be self-collapsing, thereby allowing for more travel distance for ferrule 20. Also in an example, resilient members 75 are arranged about respective guide rods 75R that serves to guide the resilient members 75 as they compress and uncompress. Guide rods 75R can be configured to extend through retention features 27 and move therethrough during the translation of ferrule 20.

Figure 25:
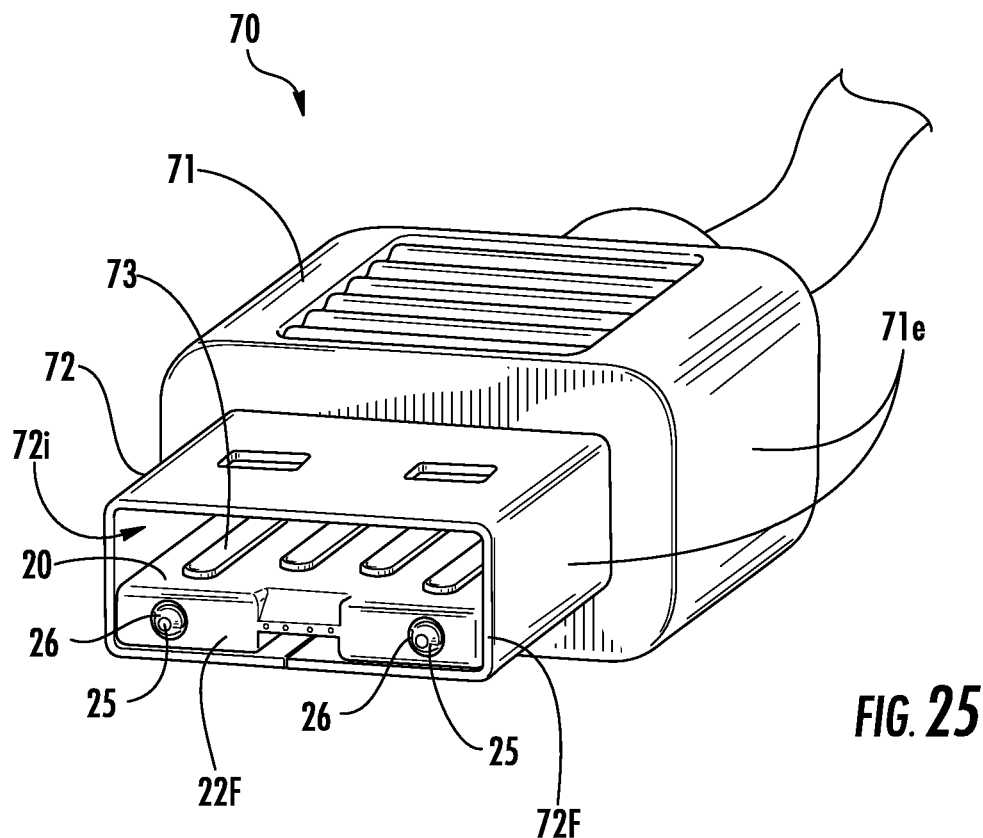
FIG. 25 is a front elevated isometric view of an example plug that illustrates an example guide pin configuration that includes recesses configured to mitigate contamination.

FIG. 25 is a front elevated isometric view of an example plug 70 that illustrates an example configuration for guide pins 25. FIG. 26 is a partial cross-sectional close-up view of plug ferrule 20 that shows an example of guide pin 25. The example guide pin configuration includes a recess 26 in the form of a trench surrounding the base of guide pin 25. Recess 26 is configured to collect contaminants 230 such as debris, dust, dirt, particulates, fluid, etc. rather than have such contaminants reside on plug ferrule front end 22F and interfere with the plug and receptacle connection. Thus, recess 26 serves to mitigate the adverse effects of contaminants on the optical connection (or optical and electrical connection) formed by mating receptacle 60 and plug 70.

Retractable Alignment Structure

Figure 27A:
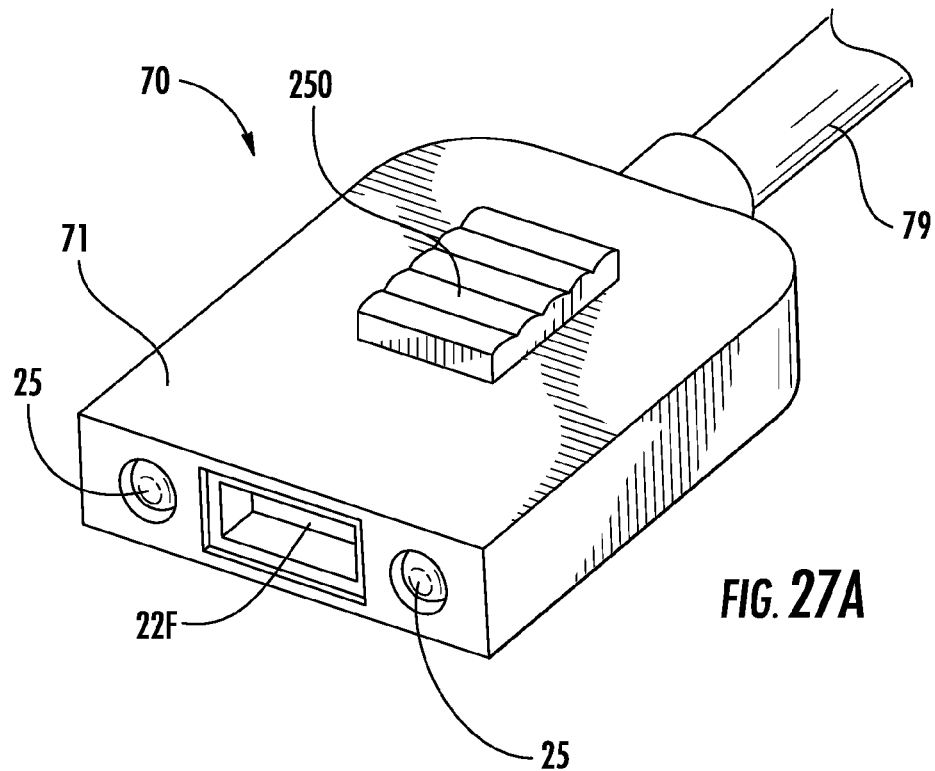
FIG. 27A and FIG. 27B are front elevated isometric views of an example plug that has extendable pins, with FIG. 27A illustrating the retracted pin position and FIG. 27B illustrating the unretracted (extended) pin position.
Figure 27B:
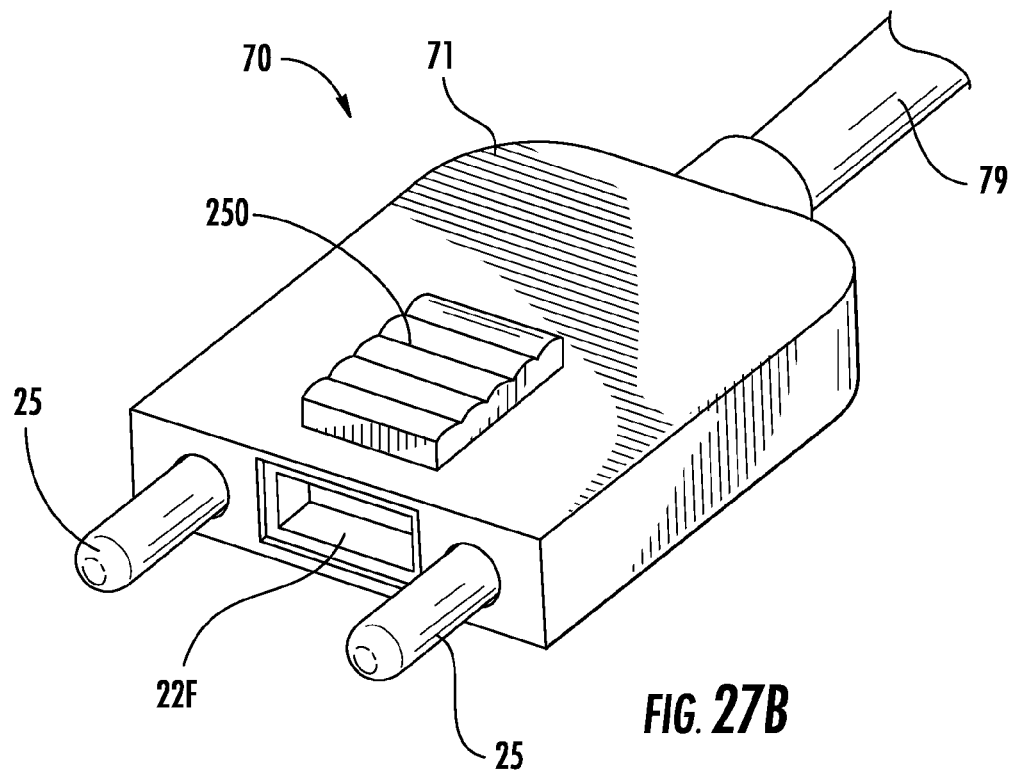
Figure 28A:
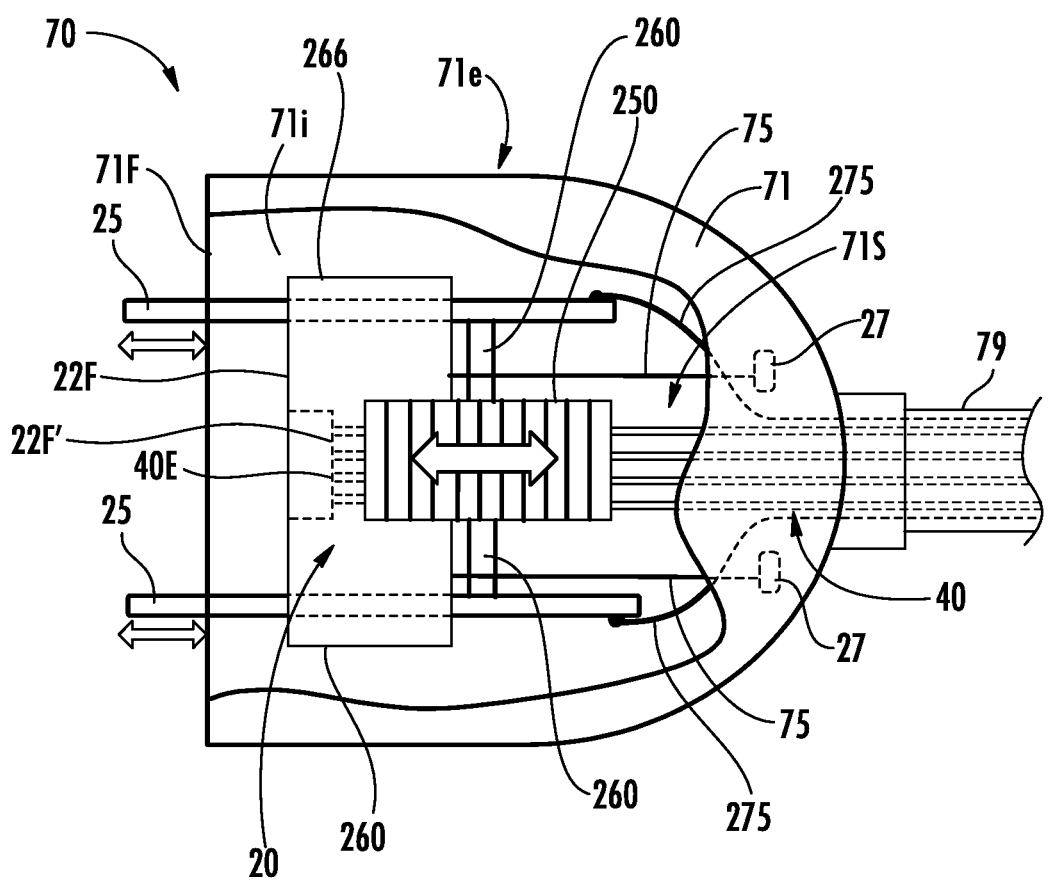
FIGS. 28A and 28B are a top-down views of an example plug 70 having retractable guide pins, illustrating two different guide pin configurations.
Figure 28B:
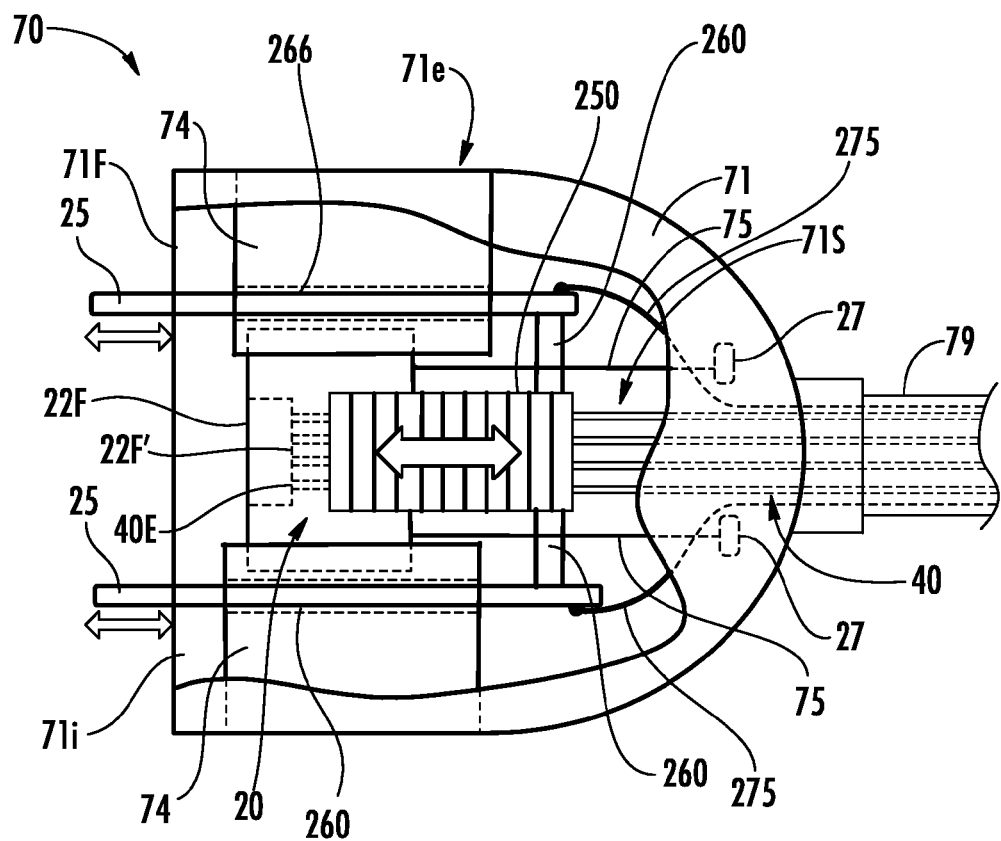

FIGS. 27A and 27B are front-end elevated isometric views of an example plug 70 having retractable alignment structure. The retractable alignment structure can be in the form of projections, pins, arms or other suitable alignment structure for alignment of the components. As an illustration, guide pins 25 are used. FIGS. 28A and 28B are a top-down views of an example plug 70 having retractable guide pins, illustrating two different guide pin configurations.

Retractable guide pins 25 are mechanically or otherwise cooperatively connected to connected to a guide pin switch 250 that allows for the guide pins to be in a retracted position (FIG. 27A) or an unretracted (extended) position (FIG. 27B). FIGS. 28A and 28B show retractable guide pins 25 mechanically connected to guide pin switch 250 via respective beams 260. In an example, retractable guide pins 25 are electrically connected to respective electrical wires 275 carried by fiber optic cable 79 and thus can served as electrical contacts that can provide power transmission.

In an example, pin switch 250 is arranged atop plug housing 71 and slides along the plug housing when translating guide pins 25. In an example, switch 250 is configured so that it can be readily engaged by a user's finger. Retractable guide pins 25 can be supported in guide pin channels 266 in plug ferrule 20 (FIG. 28A) or can be supported adjacent the plug ferrule, e.g., by guide pin channels 266 in ferrule guide 74 (FIG. 28B).

When the user wants to clean plug 70, they engage switch 250 to retract pins 25 to allow open (unimpeded) access to ferrule front end 22F and the optical interface represented by optical waveguide ends 40E. In the unretracted position of FIG. 27B, pins 25 allow access to ferrule front end 22F, but not the open access associated with the recessed pin position of FIG. 27A. Note that in the example shown in FIG. 28A and FIG. 28B, the ferrule front end 22F includes a recessed front end portion 22F' where optical fiber ends 40E reside. Other examples can have optical fiber ends residing directly at ferrule front end 22F. In either case, access to the optical fiber ends 40E is facilitated by having guide pins 25 be retractable.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present disclosure without departing from the spirit and scope of the same. Thus, it is intended that the present disclosure cover the modifications and variations of this disclosure provided they come within the scope of the appended claims and their equivalents.

We claim:

1. A fiber optic interface device comprising:
a ferrule having front and rear ends connected by one or more optical pathways configured to respectively operably support one or more optical waveguides;
one or more optical waveguides respectively supported by the one or more optical pathways;
an enclosure having front and rear ends and an interior in which the ferrule is translatably supported therein, the interior having a storage region adjacent the ferrule that is configured to loosely store one or more excess portions of the one or more optical waveguides; and
at least one resilient member operably configured relative to the ferrule to provide a forward-bias position of the ferrule when the fiber optic interface device is unmated and a rear-bias position of the ferrule when the fiber optic interface device is mated, wherein the ferrule front end resides within the enclosure interior at a distance D from the enclosure front end while in the rear-biased position, D is 0.5 mm≤D≤20 mm.

2. The fiber optic interface device of claim 1, further comprising at least one retention feature on the ferrule rear end that engages at least one resilient member.

3. The fiber optic interface device of claim 1, further comprising:
a ferrule guide supported within the enclosure and configured to slidably engage the ferrule so that the ferrule can translate between the forward-bias and rear-bias positions.

4. The fiber optic interface device of claim 1, wherein the one or more optical waveguides include at least one of: one or more optical fibers and one or more gradient-index (GRIN) lens elements.

5. The fiber optic interface device of claim 1, wherein:
the ferrule front end resides within the enclosure interior at a distance D from the enclosure front end while in the rear-biased position, D is 4 mm≤D≤8 mm.

6. The fiber optic interface device of claim 5, wherein 5 mm≤D≤7 mm.

7. The fiber optic interface device of claim 1, the ferrule comprising an angled portion adjacent the ferrule front and the optical pathway ends, the angled portion being configured to allow for laser processing of the one or more optical waveguides.

8. The fiber optic interface device of claim 1, further comprising at least one alignment structure at or adjacent the ferrule front end.

9. The fiber optic interface device of claim 8, further comprising the at least one alignment structure configured to provide power transmission.

10. The fiber optic interface device of claim 8, wherein the at least one alignment structure is retractable.

11. A fiber optic interface device comprising:
an enclosure having an axis, front and rear ends and an interior;
a ferrule configured to operably support a plurality of optical fibers, the ferrule being supported within the housing interior and being axially translatable therein;
a plurality of optical waveguides operably supported by the ferrule; and
at least one resilient member operably arranged within the enclosure interior and configured to provide a forward-bias position of the ferrule when the fiber optic interface device is unmated and a rear-bias position of the ferrule when the fiber optic interface device is mated, wherein the ferrule front end resides within the enclosure interior at a distance D from the enclosure front end when in the rear-biased position, and where D is 0.5 mm≤D≤20 mm.

12. The fiber optic interface of claim 11, further comprising the enclosure having a storage region configured to loosely store excess portions of the plurality of optical fibers.

13. The fiber optic interface of claim 11, wherein the at least one resilient member comprises a spring.

14. The fiber optic interface device of claim 11, wherein the ferrule front end resides within the enclosure interior at a distance D from the enclosure front end when in the rear-biased position, and where D is 4 mm≤D≤8 mm.

15. The fiber optic interface device of claim 14, wherein D is 5 mm≤D≤7 mm.

16. The fiber optic interface device of claim 11, further comprising one or more GRIN lens elements having respective front and rear surfaces, the GRIN lens elements being operably supported by the ferrule such that the GRIN lens element rear surfaces are interfaced with respective optical fiber ends and the GRIN lens front surfaces reside at or recessed from the ferrule front surface.

17. The fiber optic interface device of claim 11, further comprising the enclosure being configured so that the fiber optic interface device constitutes a USB fiber optic interface device.

18. The fiber optic interface device of claim 11, wherein the ferrule supports at least one electrical contact.

19. The fiber optic interface device of claim 11, wherein the ferrule front end is essentially planar and has no guide pins.

20. The fiber optic interface device of claim 11 constituting a first fiber optic interface device and further comprising the first fiber optic interface device being mated with a second fiber optic interface device having a complimentary mating geometry to the first fiber optic interface device, to form an optical connection or an optical and electrical connection, where mating the first and second fiber optic interface devices causes an axial translation of the ferrule from the forward-bias position to the rear-biased position.

21. A fiber optic interface device comprising:
an enclosure having an axis, front and rear ends and an interior;
a ferrule configured to operably support a plurality of optical fibers, the ferrule being supported within the housing interior and being axially translatable therein;
a plurality of optical waveguides operably supported by the ferrule; and
at least one resilient member operably arranged within the enclosure interior and configured to provide a forward-bias position of the ferrule when the fiber optic interface device is unmated and a rear-bias position of the ferrule when the fiber optic interface device is mated, wherein the ferrule front end resides within the enclosure interior at a distance D from the enclosure front end when in the rear-biased position, and where D is 4 mm≤D≤8 mm.

22. The fiber optic interface of claim 21, further comprising the enclosure having a storage region configured to loosely store excess portions of the plurality of optical fibers.

23. The fiber optic interface of claim 21, wherein the at least one resilient member comprises a spring.

24. The fiber optic interface device of claim 21, wherein the ferrule front end resides within the enclosure interior at a distance D from the enclosure front end when in the rear-biased position, and where D is 5 mm≤D≤7 mm.

25. The fiber optic interface device of claim 21, further comprising one or more GRIN lens elements having respective front and rear surfaces, the GRIN lens elements being operably supported by the ferrule such that the GRIN lens element rear surfaces are interfaced with respective optical fiber ends and the GRIN lens front surfaces reside at or recessed from the ferrule front surface.

26. The fiber optic interface device of claim 21, further comprising the enclosure being configured so that the fiber optic interface device constitutes a USB fiber optic interface device.

27. The fiber optic interface device of claim 21, wherein the ferrule supports at least one electrical contact.

28. The fiber optic interface device of claim 21, wherein the ferrule front end is essentially planar and has no guide pins.

29. The fiber optic interface device of claim 21 constituting a first fiber optic interface device and further comprising the first fiber optic interface device being mated with a second fiber optic interface device having a complimentary mating geometry to the first fiber optic interface device, to form an optical connection or an optical and electrical connection, where mating the first and second fiber optic interface devices causes an axial translation of the ferrule from the forward-bias position to the rear-biased position.

* * * * *